United States Patent
Khoshnevisan et al.

(10) Patent No.: US 12,362,850 B2
(45) Date of Patent: Jul. 15, 2025

(54) MULTIPLE MODULATION AND CODING SCHEME TABLES FOR MULTIPLE CODEWORDS

(71) Applicant: QUALCOMM Incorporated, San Diego, CA (US)

(72) Inventors: Mostafa Khoshnevisan, San Diego, CA (US); Ahmed Abdelaziz Ibrahim Abdelaziz Zewail, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 538 days.

(21) Appl. No.: 17/827,459

(22) Filed: May 27, 2022

(65) Prior Publication Data

US 2023/0388045 A1    Nov. 30, 2023

(51) Int. Cl.
*H04L 1/00*      (2006.01)
*H04W 24/08*   (2009.01)
*H04W 72/1263* (2023.01)
*H04W 72/23*   (2023.01)

(52) U.S. Cl.
CPC .......... *H04L 1/0003* (2013.01); *H04L 1/0061* (2013.01); *H04W 24/08* (2013.01); *H04W 72/1263* (2013.01); *H04W 72/23* (2023.01)

(58) Field of Classification Search
CPC .... H04L 1/0003; H04L 1/0061; H04W 72/23; H04W 24/08; H04W 72/1263
See application file for complete search history.

(56) References Cited

U.S. PATENT DOCUMENTS

| | | | | |
|---|---|---|---|---|
| 2010/0303052 A1* | 12/2010 | Visuri | ............... | H04L 1/0039 370/342 |
| 2011/0216723 A1* | 9/2011 | Sartori | ............... | H04L 1/0025 370/329 |
| 2015/0195819 A1* | 7/2015 | Kwon | ............... | H04L 1/0026 370/329 |
| 2016/0192337 A1* | 6/2016 | Wengerter | ............... | H04L 1/06 |
| 2016/0373287 A1* | 12/2016 | Davydov | ............... | H04L 1/0026 |
| 2017/0188345 A1* | 6/2017 | Wengerter | ............... | H04L 1/0075 |
| 2017/0359814 A1* | 12/2017 | Larsson | ............... | H04L 5/0057 |
| 2019/0394759 A1* | 12/2019 | Ying | ............... | H04L 1/0061 |
| 2021/0028882 A1* | 1/2021 | Nammi | ............... | H04L 5/0053 |
| 2021/0084532 A1* | 3/2021 | Chen | ............... | H04L 1/0005 |

(Continued)

*Primary Examiner* — Jael M Ulysse
(74) *Attorney, Agent, or Firm* — Holland & Hart LLP

(57) ABSTRACT

Methods, systems, and devices for wireless communications at a user equipment (UE) are described. The UE may receive a control message indicating a first (MCS) value and a first resource associated with a first codeword and a second MCS value and a second resource associated with a second codeword. The UE may monitor the first resource for the first codeword in accordance with one or more first parameters determined by indexing a first MCS table using the first MCS value. The UE may monitor the second resource for the second codeword in accordance with one or more second parameters determined by indexing one of the first MCS table using the second MCS value or a second MCS table using the second MCS value. The UE may decode the first codeword and the second codeword based on monitoring the first resource and the second resource.

30 Claims, 14 Drawing Sheets

(56) References Cited

U.S. PATENT DOCUMENTS

| | | | |
|---|---|---|---|
| 2022/0174697 A1* | 6/2022 | Jung | H04L 1/0003 |
| 2022/0217729 A1* | 7/2022 | Kim | H04W 72/23 |
| 2023/0046738 A1* | 2/2023 | Lee | H04L 5/0053 |

* cited by examiner

Control Message 320

First Codeword 325

Second Codeword 330

MULTIPLE MODULATION AND CODING SCHEME TABLES FOR MULTIPLE CODEWORDS

FIELD OF TECHNOLOGY

The following relates to wireless communications at a user equipment (UE), including multiple modulation and coding scheme tables for multiple codewords.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, a wireless device may receive multiple codewords. However, methods for such schemes may be improved.

SUMMARY

The described techniques relate to improved methods, systems, devices, and apparatuses that support multiple modulation and coding scheme tables for multiple codewords. For example, a user equipment (UE) may receive, from a network entity, a control message that indicates a first modulation and coding scheme value and a first resource associated with a first codeword and a second modulation and coding scheme value and a second resource associated with a second codeword. The UE may monitor, based on the control message, the first resource for the first codeword in accordance with one or more first parameters determined by indexing a first modulation and coding scheme table using the first modulation and coding scheme value. The UE may monitor, based at least in part on the control message, the second resource for the second codeword in accordance with one or more second parameters determined by indexing one of the first modulation and coding scheme table using the second modulation and coding scheme value or a second modulation and coding scheme table using the second modulation and coding scheme value. The UE may decode the first codeword and the second codeword based on monitoring the first resource and the second resource.

A method for wireless communication at a user equipment (UE) is described. The method may include receiving, from a network entity, a control message that indicates a first modulation and coding scheme value and a first resource associated with a first codeword and a second modulation and coding scheme value and a second resource associated with a second codeword, monitoring, based on the control message, the first resource for the first codeword in accordance with one or more first parameters determined by indexing a first modulation and coding scheme table using the first modulation and coding scheme value, monitoring, based on the control message, the second resource for the second codeword in accordance with one or more second parameters determined by indexing one of the first modulation and coding scheme table using the second modulation and coding scheme value or a second modulation and coding scheme table using the second modulation and coding scheme value, and decoding the first codeword and the second codeword based on monitoring the first resource and the second resource.

An apparatus for wireless communication at a UE is described. The apparatus may include a processor, memory coupled with the processor, and instructions stored in the memory. The instructions may be executable by the processor to cause the apparatus to receive, from a network entity, a control message that indicates a first modulation and coding scheme value and a first resource associated with a first codeword and a second modulation and coding scheme value and a second resource associated with a second codeword, monitor, based on the control message, the first resource for the first codeword in accordance with one or more first parameters determined by indexing a first modulation and coding scheme table using the first modulation and coding scheme value, monitor, based on the control message, the second resource for the second codeword in accordance with one or more second parameters determined by indexing one of the first modulation and coding scheme table using the second modulation and coding scheme value or a second modulation and coding scheme table using the second modulation and coding scheme value, and decode the first codeword and the second codeword based on monitoring the first resource and the second resource.

Another apparatus for wireless communication at a UE is described. The apparatus may include means for receiving, from a network entity, a control message that indicates a first modulation and coding scheme value and a first resource associated with a first codeword and a second modulation and coding scheme value and a second resource associated with a second codeword, means for monitoring, based on the control message, the first resource for the first codeword in accordance with one or more first parameters determined by indexing a first modulation and coding scheme table using the first modulation and coding scheme value, means for monitoring, based on the control message, the second resource for the second codeword in accordance with one or more second parameters determined by indexing one of the first modulation and coding scheme table using the second modulation and coding scheme value or a second modulation and coding scheme table using the second modulation and coding scheme value, and means for decoding the first codeword and the second codeword based on monitoring the first resource and the second resource.

A non-transitory computer-readable medium storing code for wireless communication at a UE is described. The code may include instructions executable by a processor to receive, from a network entity, a control message that indicates a first modulation and coding scheme value and a first resource associated with a first codeword and a second modulation and coding scheme value and a second resource associated with a second codeword, monitor, based on the control message, the first resource for the first codeword in accordance with one or more first parameters determined by indexing a first modulation and coding scheme table using the first modulation and coding scheme value, monitor, based on the control message, the second resource for the second codeword in accordance with one or more second parameters determined by indexing one of the first modulation and coding scheme table using the second modulation and coding scheme value or a second modulation and coding scheme table using the second modulation and coding scheme value, and decode the first codeword and the second codeword based on monitoring the first resource and the second resource.

Some examples of the method, apparatuses, and non-transitory computer-readable medium described herein may further include operations, features, means, or instructions for receiving, from the network entity, an indication of the first modulation and coding scheme table and the second modulation and coding scheme table and receiving the control message including a first grant scheduling transmission of a first physical downlink shared channel message including the first codeword and the second codeword.

Some examples of the method, apparatuses, and non-transitory computer-readable medium described herein may further include operations, features, means, or instructions for receiving, from the network entity, an indication of a third modulation and coding scheme table, receiving a second grant scheduling transmission of a third codeword and indicates a third modulation and coding scheme value associated with the third codeword, and receiving, from the network entity in accordance with the second grant, the third codeword based on indexing the third modulation and coding scheme table using the third modulation and coding scheme value.

Some examples of the method, apparatuses, and non-transitory computer-readable medium described herein may further include operations, features, means, or instructions for receiving the control message that may be a downlink control information message that schedules transmission of the first codeword and the second codeword and indexing the first modulation and coding scheme table, the second modulation and coding scheme table, or both, based on a format of the downlink control information message.

Some examples of the method, apparatuses, and non-transitory computer-readable medium described herein may further include operations, features, means, or instructions for receiving, from the network entity, control signaling indicating the second modulation and coding scheme table and a third modulation and coding scheme table, receiving the control message including a grant that schedules transmission of the first codeword and the second codeword and that includes cyclic redundancy check information that may be scrambled with a modulation and coding scheme cell radio network temporary identifier, receiving the first codeword based on indexing the first modulation and coding scheme table in response to the cyclic redundancy check information being scrambled with the modulation and coding scheme cell radio network temporary identifier, and receiving the second codeword based on indexing the first modulation and coding scheme table in response to the cyclic redundancy check information being scrambled with the modulation and coding scheme cell radio network temporary identifier.

Some examples of the method, apparatuses, and non-transitory computer-readable medium described herein may further include operations, features, means, or instructions for receiving, from the network entity, control signaling indicating the second modulation and coding scheme table and a third modulation and coding scheme table, receiving the control message including a grant that schedules transmission of the first codeword and the second codeword and that includes cyclic redundancy check information that may be scrambled with a modulation and coding scheme cell radio network temporary identifier, receiving the first codeword based on indexing the first modulation and coding scheme table in response to the cyclic redundancy check information being scrambled with the modulation and coding scheme cell radio network temporary identifier, and receiving the second codeword based on indexing the second modulation and coding scheme table in response to the cyclic redundancy check information being scrambled with the modulation and coding scheme cell radio network temporary identifier.

Some examples of the method, apparatuses, and non-transitory computer-readable medium described herein may further include operations, features, means, or instructions for receiving the control message including a grant that schedules transmission of the first codeword and the second codeword and that includes cyclic redundancy check information that may be scrambled with a modulation and coding scheme cell radio network temporary identifier associated with multiple modulation and coding scheme tables, receiving the first codeword based on indexing the first modulation and coding scheme table in response to the cyclic redundancy check information being scrambled with the modulation and coding scheme cell radio network temporary identifier, and receiving the second codeword based on indexing the second modulation and coding scheme table in response to the cyclic redundancy check information being scrambled with the modulation and coding scheme cell radio network temporary identifier.

Some examples of the method, apparatuses, and non-transitory computer-readable medium described herein may further include operations, features, means, or instructions for receiving the control message including a grant that schedules transmission of the first codeword and the second codeword and that includes a field with a value that indicates that the UE may be to receive the first codeword and the second codeword using different modulation and coding scheme tables, receiving the first codeword based on indexing the first modulation and coding scheme table in accordance with the value, and receiving the second codeword based on indexing the second modulation and coding scheme table in accordance with the value.

Some examples of the method, apparatuses, and non-transitory computer-readable medium described herein may further include operations, features, means, or instructions for receiving the control message including a grant that schedules transmission of the first codeword and the second codeword and that includes a field with a value that indicates that the UE may be to receive the first codeword and the second codeword using a same modulation and coding scheme table, receiving the first codeword based on indexing the first modulation and coding scheme table in accordance with the value, and receiving the second codeword based on indexing the first modulation and coding scheme table in accordance with the value.

In some examples of the method, apparatuses, and non-transitory computer-readable medium described herein, the first codeword may be a common codeword that may be to be decoded by the UE and one or more additional UEs and the second codeword may be a private codeword that may be to be decoded by the UE.

In some examples of the method, apparatuses, and non-transitory computer-readable medium described herein, the second codeword may be a common codeword that may be to be decoded by the UE and one or more additional UEs and the first codeword may be a private codeword that may be to be decoded by the UE.

In some examples of the method, apparatuses, and non-transitory computer-readable medium described herein, one or more modulation and coding schemes of the first modulation and coding scheme table may have a smaller maximum modulation order, or a smaller spectral efficiency, or both, than one or more modulation and coding schemes of the second modulation and coding scheme table.

A method for wireless communication at a network entity is described. The method may include transmitting, to a UE, a control message that indicates a first modulation and coding scheme value and a first resource associated with a first codeword and a second modulation and coding scheme value and a second resource associated with a second codeword, generating the first codeword in accordance with one or more first parameters determined by indexing a first modulation and coding scheme table using the first modulation and coding scheme value, generating the second codeword in accordance with one or more second parameters determined by indexing one of the first modulation and coding scheme table using the second modulation and coding scheme value or a second modulation and coding scheme table using the second modulation and coding scheme value, and transmitting, to the UE in accordance with the control message, the first codeword via the first resource and the second codeword via the second resource.

An apparatus for wireless communication at a network entity is described. The apparatus may include a processor, memory coupled with the processor, and instructions stored in the memory. The instructions may be executable by the processor to cause the apparatus to transmit, to a UE, a control message that indicates a first modulation and coding scheme value and a first resource associated with a first codeword and a second modulation and coding scheme value and a second resource associated with a second codeword, generate the first codeword in accordance with one or more first parameters determined by indexing a first modulation and coding scheme table using the first modulation and coding scheme value, generate the second codeword in accordance with one or more second parameters determined by indexing one of the first modulation and coding scheme table using the second modulation and coding scheme value or a second modulation and coding scheme table using the second modulation and coding scheme value, and transmit, to the UE in accordance with the control message, the first codeword via the first resource and the second codeword via the second resource.

Another apparatus for wireless communication at a network entity is described. The apparatus may include means for transmitting, to a UE, a control message that indicates a first modulation and coding scheme value and a first resource associated with a first codeword and a second modulation and coding scheme value and a second resource associated with a second codeword, means for generating the first codeword in accordance with one or more first parameters determined by indexing a first modulation and coding scheme table using the first modulation and coding scheme value, means for generating the second codeword in accordance with one or more second parameters determined by indexing one of the first modulation and coding scheme table using the second modulation and coding scheme value or a second modulation and coding scheme table using the second modulation and coding scheme value, and means for transmitting, to the UE in accordance with the control message, the first codeword via the first resource and the second codeword via the second resource.

A non-transitory computer-readable medium storing code for wireless communication at a network entity is described. The code may include instructions executable by a processor to transmit, to a UE, a control message that indicates a first modulation and coding scheme value and a first resource associated with a first codeword and a second modulation and coding scheme value and a second resource associated with a second codeword, generate the first codeword in accordance with one or more first parameters determined by indexing a first modulation and coding scheme table using the first modulation and coding scheme value, generate the second codeword in accordance with one or more second parameters determined by indexing one of the first modulation and coding scheme table using the second modulation and coding scheme value or a second modulation and coding scheme table using the second modulation and coding scheme value, and transmit, to the UE in accordance with the control message, the first codeword via the first resource and the second codeword via the second resource.

Some examples of the method, apparatuses, and non-transitory computer-readable medium described herein may further include operations, features, means, or instructions for transmitting, to the UE, an indication of the first modulation and coding scheme table and the second modulation and coding scheme table and transmitting the control message including a first grant scheduling transmission of a first physical downlink shared channel message including the first codeword and the second codeword.

Some examples of the method, apparatuses, and non-transitory computer-readable medium described herein may further include operations, features, means, or instructions for transmitting, to the UE, an indication of a third modulation and coding scheme table, transmitting a second grant scheduling transmission of a third codeword and indicates a third modulation and coding scheme value associated with the third codeword, and transmitting, to the UE in accordance with the second grant, the third codeword based on indexing the third modulation and coding scheme table using the third modulation and coding scheme value.

Some examples of the method, apparatuses, and non-transitory computer-readable medium described herein may further include operations, features, means, or instructions for transmitting the control message that may be a downlink control information message that schedules transmission of the first codeword and the second codeword and indexing the first modulation and coding scheme table, the second modulation and coding scheme table, or both, based on a format of the downlink control information message.

Some examples of the method, apparatuses, and non-transitory computer-readable medium described herein may further include operations, features, means, or instructions for transmitting, to the UE, control signaling indicating the second modulation and coding scheme table and a third modulation and coding scheme table, transmitting the control message including a grant that schedules transmission of the first codeword and the second codeword and that includes cyclic redundancy check information that may be scrambled with a modulation and coding scheme cell radio network temporary identifier, transmitting the first codeword based on indexing the first modulation and coding scheme table in response to the cyclic redundancy check information being scrambled with the modulation and coding scheme cell radio network temporary identifier, and transmitting the second codeword based on indexing the first modulation and coding scheme table in response to the cyclic redundancy check information being scrambled with the modulation and coding scheme cell radio network temporary identifier.

Some examples of the method, apparatuses, and non-transitory computer-readable medium described herein may further include operations, features, means, or instructions for transmitting, to the UE, control signaling indicating the second modulation and coding scheme table and a third modulation and coding scheme table, transmitting the control message including a grant that schedules transmission of the first codeword and the second codeword and that includes cyclic redundancy check information that may be scrambled with a modulation and coding scheme cell radio network temporary identifier, transmitting the first codeword based on indexing the first modulation and coding scheme table in response to the cyclic redundancy check information being scrambled with the modulation and coding scheme cell radio network temporary identifier, and transmitting the second codeword based on indexing the second modulation and coding scheme table in response to the cyclic redundancy check information being scrambled with the modulation and coding scheme cell radio network temporary identifier.

Some examples of the method, apparatuses, and non-transitory computer-readable medium described herein may further include operations, features, means, or instructions for transmitting the control message including a grant that schedules transmission of the first codeword and the second codeword and that includes cyclic redundancy check information that may be scrambled with a modulation and coding scheme cell radio network temporary identifier associated with of multiple modulation and coding scheme tables, transmitting the first codeword based on indexing the first modulation and coding scheme table in response to the cyclic redundancy check information being scrambled with the modulation and coding scheme cell radio network temporary identifier, and transmitting the second codeword based on indexing the second modulation and coding scheme table in response to the cyclic redundancy check information being scrambled with the modulation and coding scheme cell radio network temporary identifier.

Some examples of the method, apparatuses, and non-transitory computer-readable medium described herein may further include operations, features, means, or instructions for transmitting the control message including a grant that schedules transmission of the first codeword and the second codeword and that includes a field with a value that indicates that the UE may be to receive the first codeword and the second codeword using different modulation and coding scheme tables, transmitting the first codeword based on indexing the first modulation and coding scheme table in accordance with the value, and transmitting the second codeword based on indexing the second modulation and coding scheme table in accordance with the value.

Some examples of the method, apparatuses, and non-transitory computer-readable medium described herein may further include operations, features, means, or instructions for transmitting the control message including a grant that schedules transmission of the first codeword and the second codeword and that includes a field with a value that indicates that the UE may be to receive the first codeword and the second codeword using a same modulation and coding scheme table, transmitting the first codeword based on indexing the first modulation and coding scheme table in accordance with the value, and transmitting the second codeword based on indexing the first modulation and coding scheme table in accordance with the value.

In some examples of the method, apparatuses, and non-transitory computer-readable medium described herein, the first codeword may be a common codeword that may be to be decoded by the UE and one or more additional UEs and the second codeword may be a private codeword that may be to be decoded by the UE.

In some examples of the method, apparatuses, and non-transitory computer-readable medium described herein, the second codeword may be a common codeword that may be to be decoded by the UE and one or more additional UEs and the first codeword may be a private codeword that may be to be decoded by the UE.

In some examples of the method, apparatuses, and non-transitory computer-readable medium described herein, one or more modulation and coding schemes of the first modulation and coding scheme table may have a smaller maximum modulation order, or a smaller spectral efficiency, or both, than one or more modulation and coding schemes of the second modulation and coding scheme table.

DETAILED DESCRIPTION

In wireless communications, multiple codewords may be transmitted. For example, rate-splitting techniques may be used to improve characteristics of broadcast channels, including degrees of freedom and capacity of wireless channels. In such approaches, messages destined for various UEs may be split into "common" parts and "private" parts. The common parts of messages for the various UEs may be combined in a single common codeword (CW), and each of the private parts may be maintained separate in respective private CWs (e.g., on a per-UE basis). However, in situations involving such multiple codewords (whether they involve rate splitting or not), procedures for indexing modulation and coding scheme (MCS) values from MCS tables may be limited to indexing a single MCS table for all of the CWs. Such approaches may be improved, since this may result in higher modulation orders or coding rates being used unnecessarily.

In multiple-codeword communications, a user equipment (UE) may be scheduled to receive the multiple CWs (e.g., a common CW and a private CW). The UE may then interpret MCS fields for each of the CWs using a different MCS tables. For example, the UE may interpret a first MCS field for a first CW using a first MCS table, and the UE may interpret a second MCS field for a second CW using a second MCS table. Additionally, or alternatively, the UE may use a legacy configuration of an MCS table for one of the CWs and use one of the multiple MCS tables for another CW. In some examples in which a modulation and coding scheme cell radio network temporary identifier (MCS-C-RNTI) is configured for the UE and a cyclic redundancy check (CRC) of a scheduling downlink control information (DCI) is scrambled with the MCS-C-RNTI, the UE may use a particular table from existing specifications (e.g., MCS Table 3 with a maximum modulation order of 64QAM and lower spectral efficiency) for one or more of the codewords. Additionally, or alternatively, a scheduling DCI may include a new field indicating whether the UE is to use different MCS tables to interpret MCS fields for the multiple codewords. In these ways, the use of unnecessarily high modulation orders or coding rates may be avoided while providing such modulation orders or coding rates when appropriate.

Aspects of the disclosure are initially described in the context of wireless communications systems. Aspects of the disclosure are then described in the context of a rate-splitting scheme, a wireless communications system, and a process flow. Aspects of the disclosure are further illustrated by and described with reference to apparatus diagrams, system diagrams, and flowcharts that relate to multiple modulation and coding scheme tables for multiple codewords.

Figure 1:
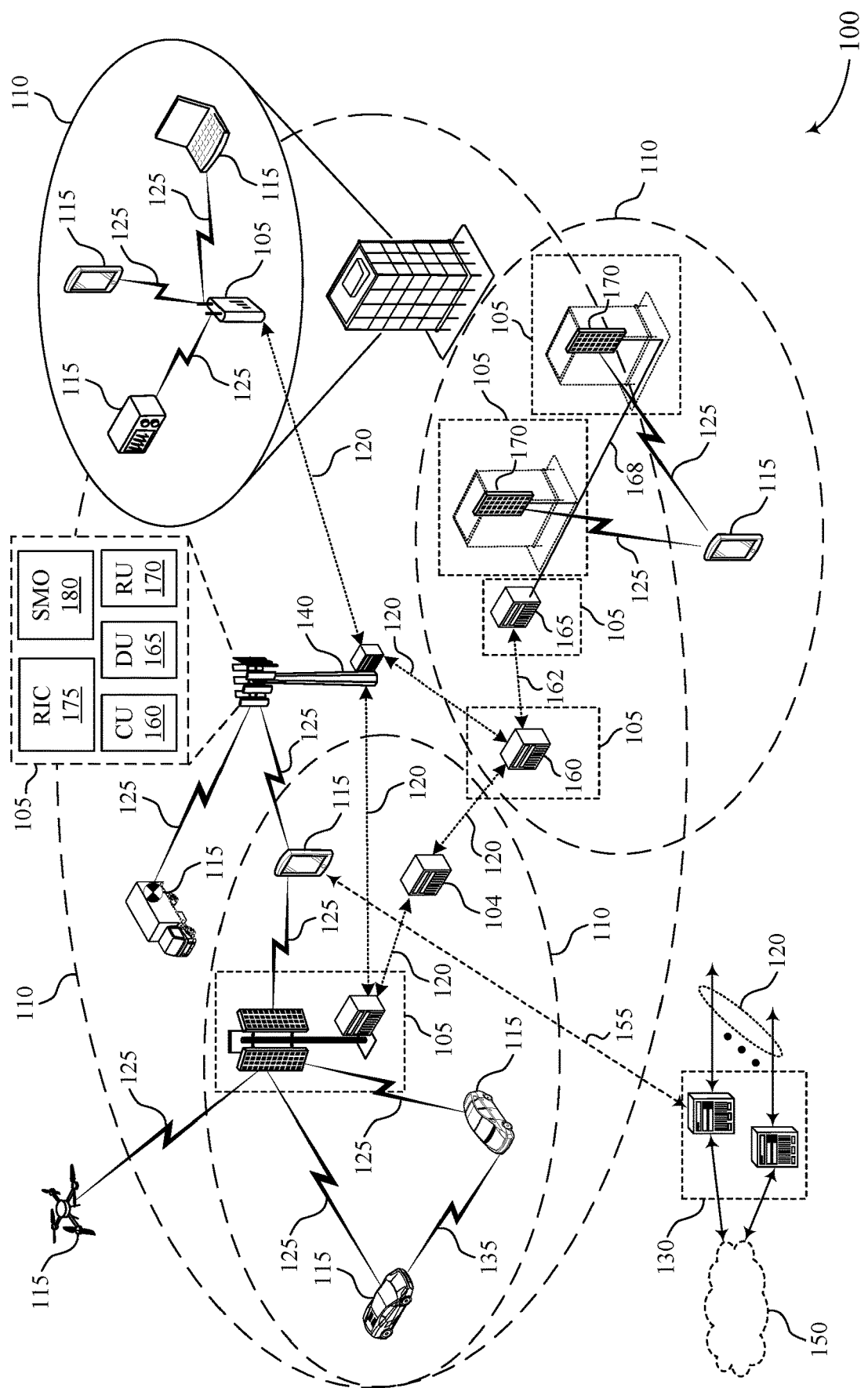
FIG. 1 illustrates an example of a wireless communications system that supports multiple modulation and coding scheme tables for multiple codewords in accordance with one or more aspects of the present disclosure.

FIG. 1 illustrates an example of a wireless communications system 100 that supports multiple modulation and coding scheme tables for multiple codewords in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, anode of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support multiple modulation and coding scheme tables for multiple codewords as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some implementations, a UE 115 may be scheduled (e.g., by a network entity 105) to receive multiple CWs (e.g., in a rate splitting scenario or other scenario involving multiple CWs) through control signaling or control messaging (e.g., a DCI). Such control signaling may indicate multiple MCS values that the UE 115 is to use to index multiple MCS tables to determine, select, or otherwise obtain multiple MCSs to use for receiving the multiple CWs. For example, the network entity 105 may transmit a first MCS value for indexing a first MCS table and the network entity 105 may transmit a second MCS value for indexing a second MCS table, and the first MCS table and the second MCS table may be different tables. In this way, different MCSs may be used for different CWs to improve efficiency and reduce overhead for wireless communications.

Figure 2A:
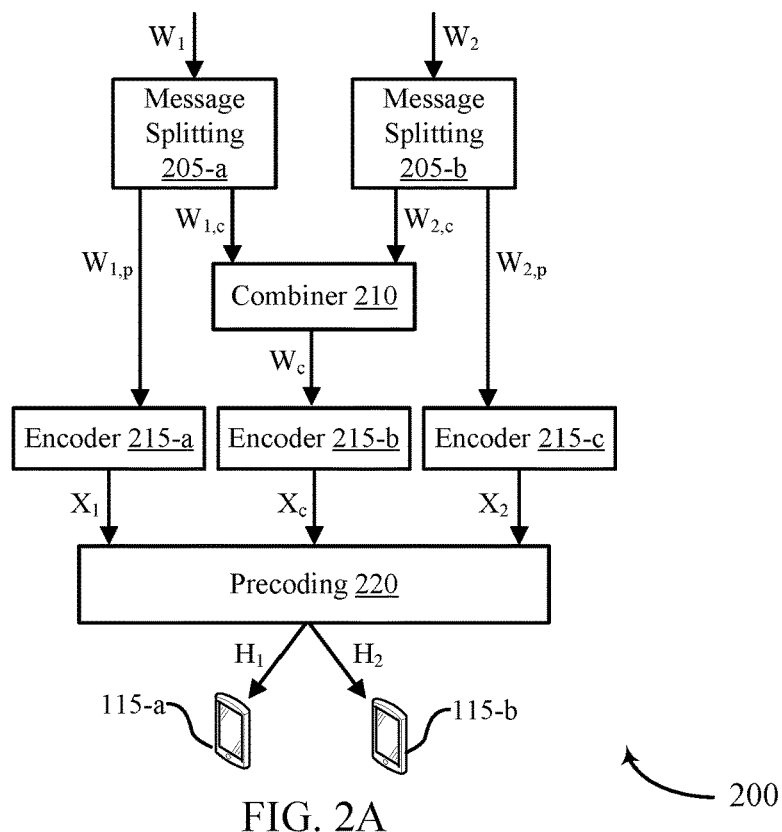
FIGS. 2A and 2B illustrate an example of a rate-splitting scheme that supports multiple modulation and coding scheme tables for multiple codewords in accordance with one or more aspects of the present disclosure.
Figure 2B:
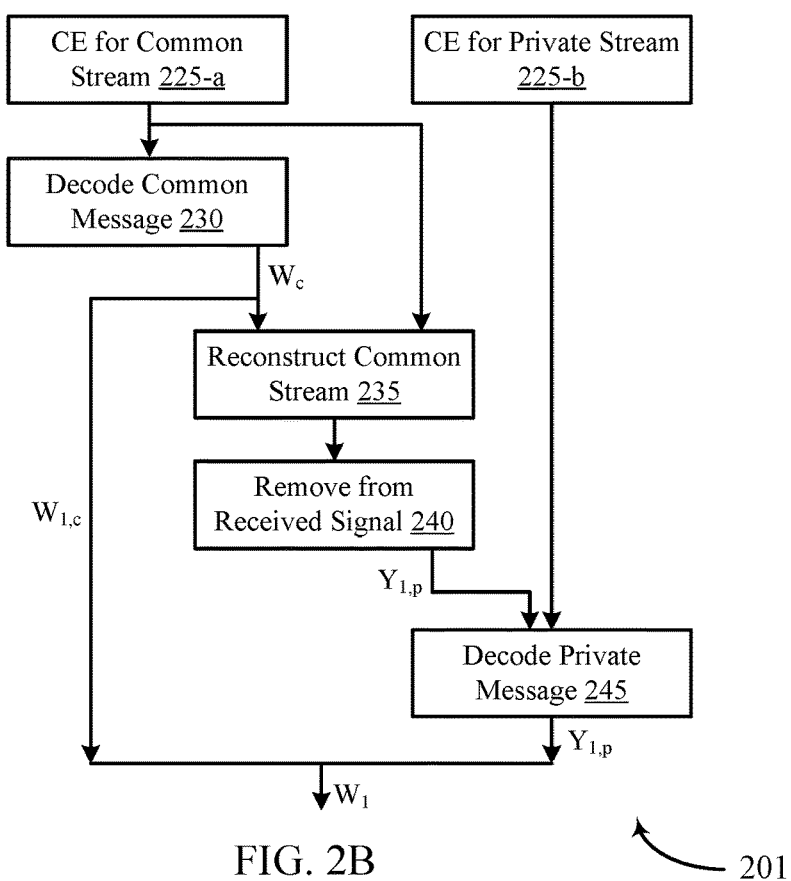

FIGS. 2A and 2B illustrate an example of a rate-splitting transmission scheme 200 and a rate-splitting reception scheme 201 that support multiple modulation and coding scheme tables for multiple codewords in accordance with one or more aspects of the present disclosure. In wireless communications, rate-splitting techniques may be used to improve characteristics of communication channels, including degrees of freedom and capacity of wireless channels. In such approaches, messages destined for various UEs may be split into "common" parts and "private" parts. The common parts of messages for the various UEs may be combined in a single common codeword (CW), and each of the private parts may be maintained separate in respective private CWs (e.g., on a per-UE basis). The common CW may be transmitted to multiple UEs and each private CW may each respectively be transmitted to each of the multiple UEs, so that each UE may receive their entire respective messages.

For example, as depicted in FIG. 2A, UE 115-*a* and UE 115-*b* may each have a message that they are to receive, depicted as $W_1$ and $W_2$. Each of the messages $W_1$ and $W_2$ may be split via message splitting 205-*a* and message splitting 205-*b*, respectively, resulting in $W_{1,p}$, representing a portion of the message corresponding to a private codeword for UE 115-*a*, and $W_{1,c}$, representing a portion of the message corresponding to common codeword. Similar splitting for $W_2$ results in $W_{2,p}$, representing a portion of the message corresponding to a private codeword for UE 115-*b*, and $W_{2,c}$, representing a portion of the message corresponding to the common codeword. The splitting between the private and common messages or codewords may be determined or selected based on one or more characteristics of a channel, one or more wireless devices, or any combination thereof. The combiner 210 may combine $W_{1,c}$ and $W_{2,c}$, resulting in $W_c$, which may have one or more layers. Each of $W_{1,p}$, $W_c$, and $W_{2,p}$ may be encoded by encoder 215-*a*, encoder 215-*b*, and encoder 215-*c*, respectively, resulting in separate CWs $X_1$, $X_c$, and $X_2$. In some examples, the encoders 215 may include one or more additional operations, including modulation, layer mapping, other operations, or any combination thereof. CWs $X_1$, $X_c$, and $X_2$ may be processed through precoding 220, resulting in $H_1$ destined for UE 115-*a* and $H_2$ destined for UE 115-*b*. In this way, each UE receives the private portion of its message that is only transmitted to that UE, while also receiving the common portion of the message that is transmitted to both UE 115-*a* and UE 115-*b*.

In FIG. 2B, an example reception scheme for rate splitting is depicted. The UE may receive the transmission (e.g., $H_1$ or $H_2$) destined for the UE, and the UE may then first decode the common message. Decoding the common message may be done for multiple purposes. First, some part of the individual message for each UE ($W_{1,c}$ and $W_{2,c}$) may be embedded in the common message $W_c$, which is the data intended for that UE. Second, successive interference cancelation may be used to decode the private message.

Figure 3:
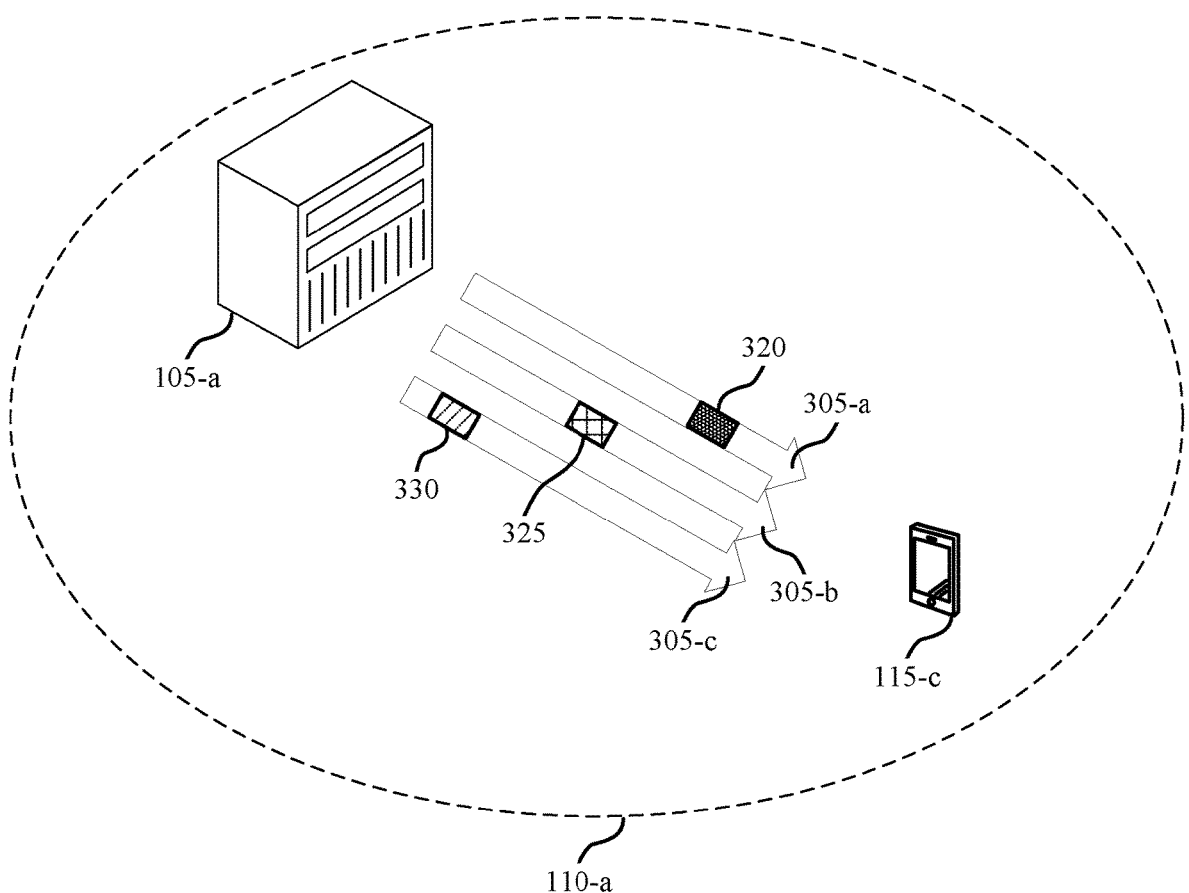
FIG. 3 illustrates an example of a wireless communications system that supports multiple modulation and coding scheme tables for multiple codewords in accordance with one or more aspects of the present disclosure.
Figure 3:
Figure 3:
Figure 3:

For example, the UE may estimate the effective channel (e.g., at CE for Common Stream 225-*a*) corresponding to common stream (e.g., $H_1P_c$), decodes the common message $W_c$ (e.g., at Decode Common Message 230), re-encodes to common stream $X_c$ (e.g., at Reconstruct Common Stream 235), multiplies by the estimated effective channel and subtracts from the received signal (e.g., at Remove from Received Signal 240), resulting in $Y_{1,p}$. Then, the UE may decode the private message using $Y_{1,p}$ (e.g., at Decode Private Message 245), which may also incorporate or utilize a result of the CE for Private Stream 225-*b*. Optionally, the decoding may also include demodulation, demapping (e.g., from one or more layers), other processing, or any combination thereof. Then, the UE may combine a portion of the common message $W_{1,c}$ and the private message $Y_{1,p}$ to recover the full message destined for the UE ($W_1$). In this way, the wireless communications system may utilize rate splitting to improve characteristics of communication channels, including degrees of freedom and capacity of wireless channels FIG. 3 illustrates an example of a wireless communications system 300 that supports multiple modulation and coding scheme tables for multiple codewords in accordance with one or more aspects of the present disclosure. The wireless communications system 300 may involve network entity 105-*a* that may be an example of one or more network entities discussed in relation to other figures. The wireless communications system 300 may involve the UE 115-*a* that may be an example of UEs discussed in relation to other figures.

In some examples, the UE 115 *a* may be located in a geographic coverage area 110-*a* that may be associated with the network entity 105-*a*. The network entity 105-*a* and UE 115-*c* may communicate via one or more downlink communication links and one or more uplink communication links. Further, the network entity 115-*c* may communicate with the UE 115-*c* via one or more resources 305. Resources 305-*a*, 305-*b*, and 305-*c* may overlap (e.g., in time, space, frequency, or any combination thereof), or may not overlap in various combinations.

In wireless communications (e.g., NR communications), multiple layers may be used for transmission of multiple CWs, and the multiple CWs may be mapped to different layers of a single PDSCH transmission. For example, given 5 layers, a first CW may be mapped to the first 2 layers and a second CW may be mapped to the remaining 3 layers (e.g., in a 2+3 division or scheme). For example, if a parameter designating a maximum number of CWs that are to be scheduled (e.g., axNrofCodeWordsScheduledByDCI) equals or has a value of 2, control signaling (e.g., DCI) that schedules a PDSCH transmission (e.g., of a DCI format, such as 1_1) may include separate fields for one or more fields for MCS, new data indicator (NDI), redundancy version (RV), or any combination thereof, for multiple CWs. In some examples, one or more other scheduling parameters such as HARQ ID, FDRA, TDRA, PRG size, other parameters, or any combination thereof, may be the same for the two scheduled CWs.

An MCS table may be used to interpret the received MCS fields of the control signaling, and such an MCS table may be determined, selected, or configured as a function of control signaling (e.g., DCI), scrambling (e.g., a radio network temporary identifier (RNTI) may be scrambled with a CRC of a DCI), or any combination thereof.

Multiple MCS tables may be defined or configured. For example, Table 1 and Table 2 (below) depict examples of such MCS tables. In some approaches, four MCS tables may be defined or used. In some such examples, one or more tables have 32 entries corresponding to a number of bits (e.g., 5 bits) of an MCS field. In some examples, a quantity of last entries (e.g., three to five entries) may indicate one or more modulation orders (e.g., may be reserved for or associated with one or more retransmission procedures).

For example, a first table may be designated as Table 1. Table 1 may be an MCS table with a maximum modulation order of 64QAM. A Table 2 may have a maximum modulation order of 256QAM. A Table 3 may have a maximum modulation order of 64QAM, and may further have or be associated with a smaller spectral efficiency, a smaller target code rate, or both, as compared to Table 1. A Table 4 may have a maximum modulation order of 1024QAM. In some examples, an order of maximum spectral efficiency of such tables may be the following: Table 3<Table 1<Table 2<Table 4.

TABLE 1

| MCS Index $I_{MCS}$ | Modulation Order $Q_m$ | Target code rate R x {1024} | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |

TABLE 1-continued

| MCS Index $I_{MCS}$ | Modulation Order $Q_m$ | Target code rate R x {1024} | Spectral efficiency |
|---|---|---|---|
| 4 | 2 | 308 | 0.6016 |
| ... | ... | ... | ... |
| 29 | 2 | reserved | |
| 30 | 4 | reserved | |
| 31 | 6 | reserved | |

TABLE 2

| MCS Index $I_{MCS}$ | Modulation Order $Q_m$ | Target code rate R x {1024} | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| ... | ... | ... | ... |
| 28 | 2 | reserved | |
| 29 | 4 | reserved | |
| 30 | 6 | reserved | |
| 31 | 8 | reserved | |

In some examples, control signaling (e.g., RRC signaling) may configure an MCS table by one or more parameters (e.g., mcs-Table, mcs-TableDCI-1-2 for PDSCH scheduled by DCI format 1_2, one or more other parameters, or any combination thereof) that may configure one or more values from possible values of 'qam256', 'qam64LowSE', and 'qam1024' which may correspond to Table 2, Table 3, and Table 4 as described herein. In some examples, if such a parameter is absent, a default value of 'qam64' may be selected or assumed, which may correspond to Table 1 as described herein.

In some examples, if an MCS-C-RNTI is not configured, one or more tables configured by one or more control signaling parameters (e.g., RRC parameters as described herein) (or a default selection of Table 1 if not configured) may be used when corresponding control signaling of a format (e.g., DCI of a DCI format) schedules a PDSCH transmission.

However, if an MCS-C-RNTI is configured, the RNTI (e.g., MCS-C-RNTI versus C-RNTI) that may be scrambled with the CRC of the scheduling control signaling (e.g., DCI) may play a role in MCS table selection. For example, in some cases, Table 3 as described herein may be used if MCS-C-RNTI is scrambled with a CRC of scheduling control signaling (e.g., DCI) irrespective of the parameters (e.g., RRC parameters) as described herein (e.g., a network entity may dynamically switch between MCS tables this way). In some examples of a PDSCH transmission with two CWs scheduled by control signaling (e.g., DCI), a same MCS table may be selected or determined (e.g., based on the procedures described herein) for interpretation of the two MCS fields (e.g., for the two CWs) of the DCI.

In some such examples, however, MCS table selection or determination may not provide for CW dependent selection (e.g., a same MCS table may be used in associated with multiple CWs). In some examples, even though two MCS fields or values may be indicated in control signaling (and may therefore indicate different values), the same MCS table with the same entries or same max spectral efficiency is used to interpret the two MCS fields or values.

In the case of rate splitting, assuming that the first CW includes the common CW and the second CW includes the private CW (or vice-versa), using the same MCS table to interpret the two MCS fields may be sub-optimal.

The common CW (c-CW) may be intended to be decoded by multiple co-scheduled UEs or other devices, and therefore, a low MCS may be more typical. As such, high modulation orders/coding rates may be sub-optimal. For example, MCS Table 1 (e.g., with a maximum modulation order of 64 QAM) or MCS table 3 (with max mod order of 64 QAM and lower SE) may be better suited for such a case.

The private CW (p-CW), however, may not be decoded by multiple co-scheduled UEs or other devices, and may only be decoded by the corresponding UE. As such, the use of a zero-forcing precoder for the private stream may reduce or minimize inter-UE interference. Further, if the receiving UE performs successive interference cancelation the interference from the common stream may be removed before decoding the p-CW. Such approaches may result in a high signal-to-interference-and-noise-interference ratio (SINR) for the private stream, which means that higher modulation orders/coding rates may be appropriate. For example, MCS Table 2 (e.g., with a maximum modulation order of 256 QAM) or MCS Table 4 (e.g., with a maximum modulation order of 1024 QAM) may be better suited for such a situation.

As such, to offer improved channel characteristics and reduced overhead, among other advantages described herein, the use of multiple MCS tables in association with multiple CWs may be used. For example, the network entity 115-c may transmit a control message 320 to the UE 115-c (e.g., over resources 305-a). The control message 320 may indicate a first MCS value and associated resources (e.g., resources 305-b) in which the first codeword 325 may be transmitted. The control message 320 may also indicate a second MCS value and associated resources (e.g., resources 305-c) over which a second codeword 330 may be transmitted. The UE 115-c may use one or more parameters obtained from indexing one or more MCS tables using the first MCS value, the second MCS value, or both, to monitor the resources 305-b and the resources 305-c for the first codeword 325 and the second codeword 330, respectively. In some cases, the UE 115-c may index a same MCS table using the first and second MCS values, or may index different MCS tables using the first and second MCS values. The UE 115-c may then receive the first codeword 325, the second codeword 330, or both, and may decode the first codeword 325, the second codeword 330, or both. In this way, the wireless communications system 300 may utilize multiple MCS tables that may be better suited for different communications scenarios or characteristics. In an example, for a PDSCH with two transport blocks scheduled by a DCI that indicates two MCS fields, the first MCS field (for the first TB) is interpreted based on a first MCS table and the second MCS field (for the second TB) is interpreted based on a second MCS table, where the first MCS table and the second MCS table may be different. It is noted that the terms transport block (TB), code word (CW), and stream are used interchangeably herein. Thus, techniques discussing a CW may be similarly apply to TBs, a stream, or both. For example, techniques described herein for a c-CW and p-CW, or a first CW and a second CW, may similarly apply for a c-stream and a p-stream, or a first stream and a second stream (e.g. where each stream can have multiple layers, multiple ports, or both), a c-TB and p-TB, or a first TB and a second TB, or the like, or any combination thereof.

The approaches described herein are not limited to the rate-splitting scenarios described herein, but they do offer advantages and flexibility in such scenarios. In some cases, a first scheduled CW may be the c-CW and the second scheduled CW may be the p-CW. Alternatively, the first scheduled CW may be the p-CW and the second scheduled CW may be the c-CW. In some cases, a first MCS table (e.g., associated with the c-CW) may have a smaller maximum modulation order, smaller spectral efficiency (e.g., for each MCS index or row), or both, than a second MCS table (e.g., associated with p-TB).

In some examples, control signaling (e.g., RRC signaling) may configure multiple MCS tables, which may be used when further control signaling (e.g., DCI) schedules a PDSCH transmission with multiple CWs. This may be applicable to a component carrier that may be configured with a parameter associated with a number of scheduled CWs (e.g., maxNrofCodeWordsScheduledByDCI) that may equal or carry a value of 2.

In some examples, the two configured MCS tables (e.g., RRC-configured MCS tables) may be different than legacy approaches to configuration of MCS tables. For example, a legacy control signaling-configured MCS table may be used when a PDSCH transmission only includes a single CW, while the improved approaches described herein involving multiple control signaling-configured (e.g., RRC-configured) tables are used when a PDSCH transmission includes multiple CWs.

In other examples, a legacy control signaling-configured (e.g., RRC-configured) MCS table may be used for a first CW/c-CW (or the second CW/p-CW) of the scheduled PDSCH transmission and a second control signaling-configured (e.g., RRC-configured) MCS table may be used for the second CW/p-CW (or the first CW/c-CW). In some cases, if the second MCS table is not configured, a default behavior may be specified. For examples, the same MCS table may be used for both the first and second CWs (e.g., the second MCS table is the same as the first MCS table). Additionally, or alternatively, the second MCS table may be MCS Table 1 (e.g., with a maximum modulation order 64 QAM with normal spectral efficiency).

In some examples, the MCS tables may be separately configured for different control signaling formats (e.g., DCI formats). For examples, different MCS tables may be used depending on a control signaling format (e.g., DCI format) that schedules the PDSCH transmission that bears the multiple CWs. In some cases, two MCS tables associated with control signaling of a control signaling format (e.g., DCI format 11) may be configured through additional control signaling (e.g., RRC signaling). Additionally, or alternatively, two MCS tables associated with control signaling of another control signaling format (e.g., DCI format 1_2) may be configured through additional control signaling (e.g., RRC signaling).

In some examples of the subject matter described herein, the use of multiple MCS tables may be influenced or based on RNTIs. If an MCS-C-RNTI is configured for the UE and a CRC of the scheduling control signaling (e.g., DCI) that schedules a PDSCH transmission with multiple CWs is scrambled with MCS-C-RNTI, implementation of the use of multiple MCS tables may be configured differently. For example, the MCS Table 3 (e.g., with a maximum modulation order of 64QAM and low spectral efficiency) may be used for both CWs irrespective of control signaling (e.g., RRC) configurations of MCS tables (e.g., multiple RRC-configured MCS tables as described herein) when control signaling (e.g., DCI) that schedules the PDSCH transmission with multiple CWs is scrambled with the MCS-C-RNTI. Additionally, or alternatively, the MCS table 3 (e.g., with a maximum modulation order of 64QAM and low spectral efficiency) may be used for the first CW only (or c-CW in case of rate splitting) irrespective of the first control signaling-configured (e.g., RRC-configured) MCS table, while the UE or other wireless device uses a control signaling-configured (e.g., RRC-configured) MCS table for the second CW (or p-CW in case of rate splitting) when control signaling (e.g., DCI) that schedules the PDSCH transmission with multiple CWs is scrambled with the MCS-C-RNTI.

In some examples, a new RNTI (e.g., "TwoCW-MCS-C-RNTI") associated with the use of multiple CWs, multiple MCS tables, or both, may be defined. In cases in which this new RNTI may be configured for the UE and scheduling control signaling (e.g., DCI) has a CRC scrambled with this new RNTI and schedules a PDSCH transmission with multiple CWs, the UE or other wireless device may use different MCS tables to interpret the two MCS fields associated with the two CWs. In other words, the determination of whether to follow the behavior involving the use of multiple MCS tables as described herein or to follow legacy behavior may be determined dynamically based on an RNTI (e.g., the new RNTI described herein) that is scrambled with the scheduling control signaling (e.g., DCI).

In some examples, a new field (e.g., with 1-bit) may be added to control signaling (e.g., DCI) scheduling a PDSCH transmission with multiple CWs. Such a new field may indicate whether the UE or other wireless device should use different MCS tables to interpret the two MCS fields associated with the two CWs or not. In other words, the determination of whether to follow the behavior involving the use of multiple MCS tables as described herein or to follow legacy behavior is determined dynamically based on the value of this new DCI field (e.g., if 0 follow legacy, if 1 follow new behavior or vice-versa). In some examples, the presence of this new field may be separately configured (e.g., by RRC) for different control signaling (e.g., DCI) formats (e.g., DCI format 1_1 versus DCI format 1_2).

Figure 4:
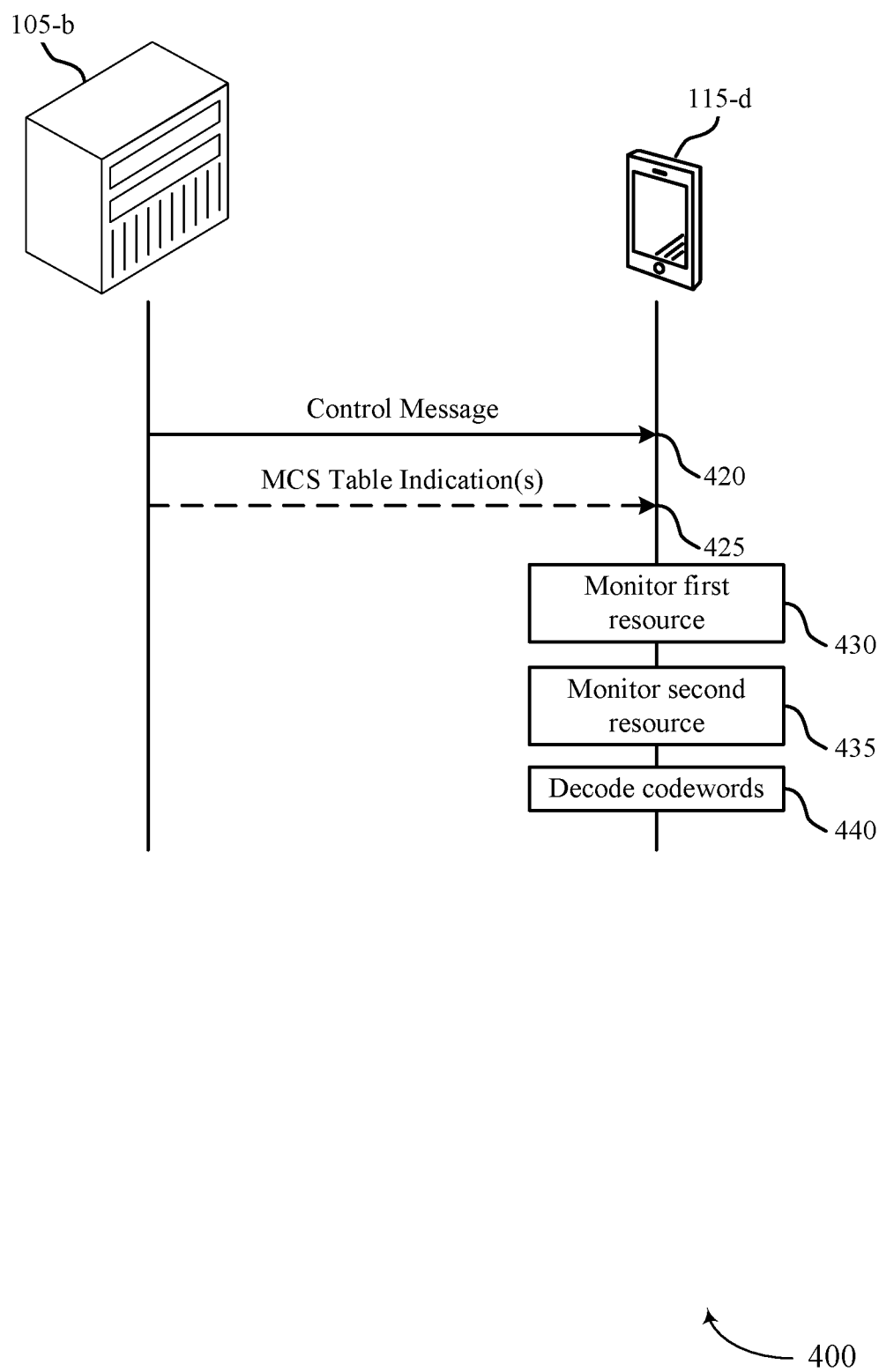
FIG. 4 illustrates an example of a process flow that supports multiple modulation and coding scheme tables for multiple codewords in accordance with one or more aspects of the present disclosure.

FIG. 4 illustrates an example of a process flow 400 that supports multiple modulation and coding scheme tables for multiple codewords in accordance with one or more aspects of the present disclosure.

The process flow 400 may implement various aspects of the present disclosure described herein. The elements described in the process flow 400 (e.g., network entity 115-b and UE 115-d) may be examples of similarly-named elements described herein. In the following description of the process flow 400, the operations between the various entities or elements may be performed in different orders or at different times. Some operations may also be left out of the process flow 400, or other operations may be added. Although the various entities or elements are shown performing the operations of the process flow 400, some aspects of some operations may also be performed by other entities or elements of the process flow 400 or by entities or elements that are not depicted in the process flow, or any combination thereof.

At 420, the UE 115-d may receive, from a network entity, a control message that may indicate a first modulation and coding scheme value and a first resource associated with a first codeword and a second modulation and coding scheme value and a second resource associated with a second codeword.

In some examples, the UE 115-d may receive the control message that may be a downlink control information message that schedules transmission of the first codeword and the second codeword. In some examples, the UE 115-d may receive the control message that may include a first grant scheduling transmission of a first physical downlink shared channel message that may include the first codeword and the second codeword. In some examples, the UE 115-*d* may receive a second grant scheduling transmission of a third codeword and may indicate a third modulation and coding scheme value associated with the third codeword.

In some examples, the UE 115-*d* may receive the control message that may include a grant that schedules transmission of the first codeword and the second codeword and that may include cyclic redundancy check information that is scrambled with a modulation and coding scheme cell radio network temporary identifier. In some examples, the UE 115-*d* may receive the control message that may include a grant that schedules transmission of the first codeword and the second codeword and that may include cyclic redundancy check information that is scrambled with a modulation and coding scheme cell radio network temporary identifier associated with multiple modulation and coding scheme tables.

In some examples, the UE 115-*d* may receive the control message that may include a grant that schedules transmission of the first codeword and the second codeword and that may include a field with a value that indicates that the UE is to receive the first codeword and the second codeword using different modulation and coding scheme tables. In some examples, the UE 115-*d* may receive the control message that may include a grant that schedules transmission of the first codeword and the second codeword and that may include a field with a value that indicates that the UE is to receive the first codeword and the second codeword using a same modulation and coding scheme table.

In some examples, the first codeword may be a common codeword that is to be decoded by the UE and one or more additional UEs and the second codeword may be a private codeword that is to be decoded by the UE. In some examples, the second codeword may be a common codeword that is to be decoded by the UE and one or more additional UEs and the first codeword may be a private codeword that is to be decoded by the UE.

At 425, the UE 115-*d* may receive, from the network entity, an indication of the first modulation and coding scheme table and the second modulation and coding scheme table. In some examples, the UE 115-*d* may receive, from the network entity, an indication of a third modulation and coding scheme table. In some examples, the UE 115-*d* may receive, from the network entity, control signaling that may indicate the second modulation and coding scheme table and a third modulation and coding scheme table. In some examples, one or more modulation and coding schemes of the first modulation and coding scheme table may have a smaller maximum modulation order, or a smaller spectral efficiency, or both, than one or more modulation and coding schemes of the second modulation and coding scheme table.

At 430, the UE 115-*d* may monitor, based on the control message, the first resource for the first codeword in accordance with one or more first parameters determined by indexing a first modulation and coding scheme table using the first modulation and coding scheme value. In some examples, the UE 115-*d* may index the first modulation and coding scheme table, the second modulation and coding scheme table, or both, based on a format of the downlink control information message. In some examples, the UE 115-*d* may receive the first codeword based on indexing the first modulation and coding scheme table in response to the cyclic redundancy check information being scrambled with the modulation and coding scheme cell radio network temporary identifier. In some examples, the UE 115-*d* may receive the first codeword based on indexing the first modulation and coding scheme table in accordance with the value.

At 435, the UE 115-*d* may monitor, based on the control message, the second resource for the second codeword in accordance with one or more second parameters determined by indexing one of the first modulation and coding scheme table using the second modulation and coding scheme value or a second modulation and coding scheme table using the second modulation and coding scheme value. In some examples, the UE 115-*d* may index the first modulation and coding scheme table, the second modulation and coding scheme table, or both, based on a format of the downlink control information message.

In some examples, the UE 115-*d* may receive the second codeword based on indexing the first modulation and coding scheme table in response to the cyclic redundancy check information being scrambled with the modulation and coding scheme cell radio network temporary identifier. In some examples, the UE 115-*d* may receive the second codeword based on indexing the second modulation and coding scheme table in response to the cyclic redundancy check information being scrambled with the modulation and coding scheme cell radio network temporary identifier. In some examples, the UE 115-*d* may receive the second codeword based on indexing the second modulation and coding scheme table in accordance with the value.

At 440, the UE 115-*d* may decode the first codeword and the second codeword based on monitoring the first resource and the second resource. In some examples, the UE 115-*d* may receive, from the network entity in accordance with the second grant, the third codeword based on indexing the third modulation and coding scheme table using the third modulation and coding scheme value.

Figure 5:
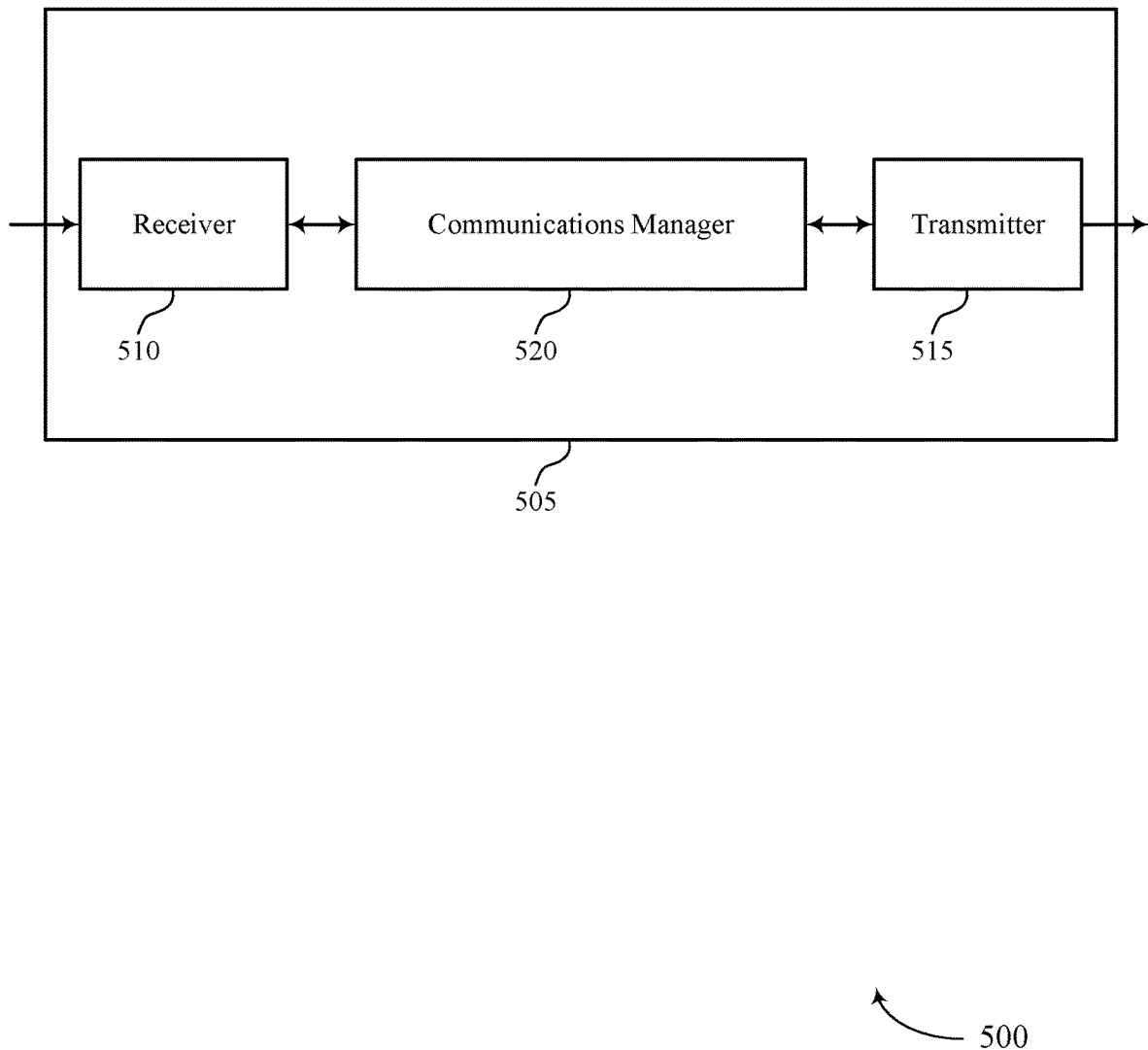
FIGS. 5 and 6 show block diagrams of devices that support multiple modulation and coding scheme tables for multiple codewords in accordance with one or more aspects of the present disclosure.

FIG. 5 shows a block diagram 500 of a device 505 that supports multiple modulation and coding scheme tables for multiple codewords in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to multiple modulation and coding scheme tables for multiple codewords). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to multiple modulation and coding scheme tables for multiple codewords). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of multiple modulation and coding scheme tables for multiple codewords as described herein.

For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

Additionally, or alternatively, the communications manager 520 may support wireless communication at a UE in accordance with examples as disclosed herein. For example, the communications manager 520 may be configured as or otherwise support a means for receiving, from a network entity, a control message that indicates a first modulation and coding scheme value and a first resource associated with a first codeword and a second modulation and coding scheme value and a second resource associated with a second codeword. The communications manager 520 may be configured as or otherwise support a means for monitoring, based on the control message, the first resource for the first codeword in accordance with one or more first parameters determined by indexing a first modulation and coding scheme table using the first modulation and coding scheme value. The communications manager 520 may be configured as or otherwise support a means for monitoring, based on the control message, the second resource for the second codeword in accordance with one or more second parameters determined by indexing one of the first modulation and coding scheme table using the second modulation and coding scheme value or a second modulation and coding scheme table using the second modulation and coding scheme value. The communications manager 520 may be configured as or otherwise support a means for decoding the first codeword and the second codeword based on monitoring the first resource and the second resource.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for reduced processing, reduced power consumption, more efficient utilization of communication resources, or any combination thereof.

Figure 6:
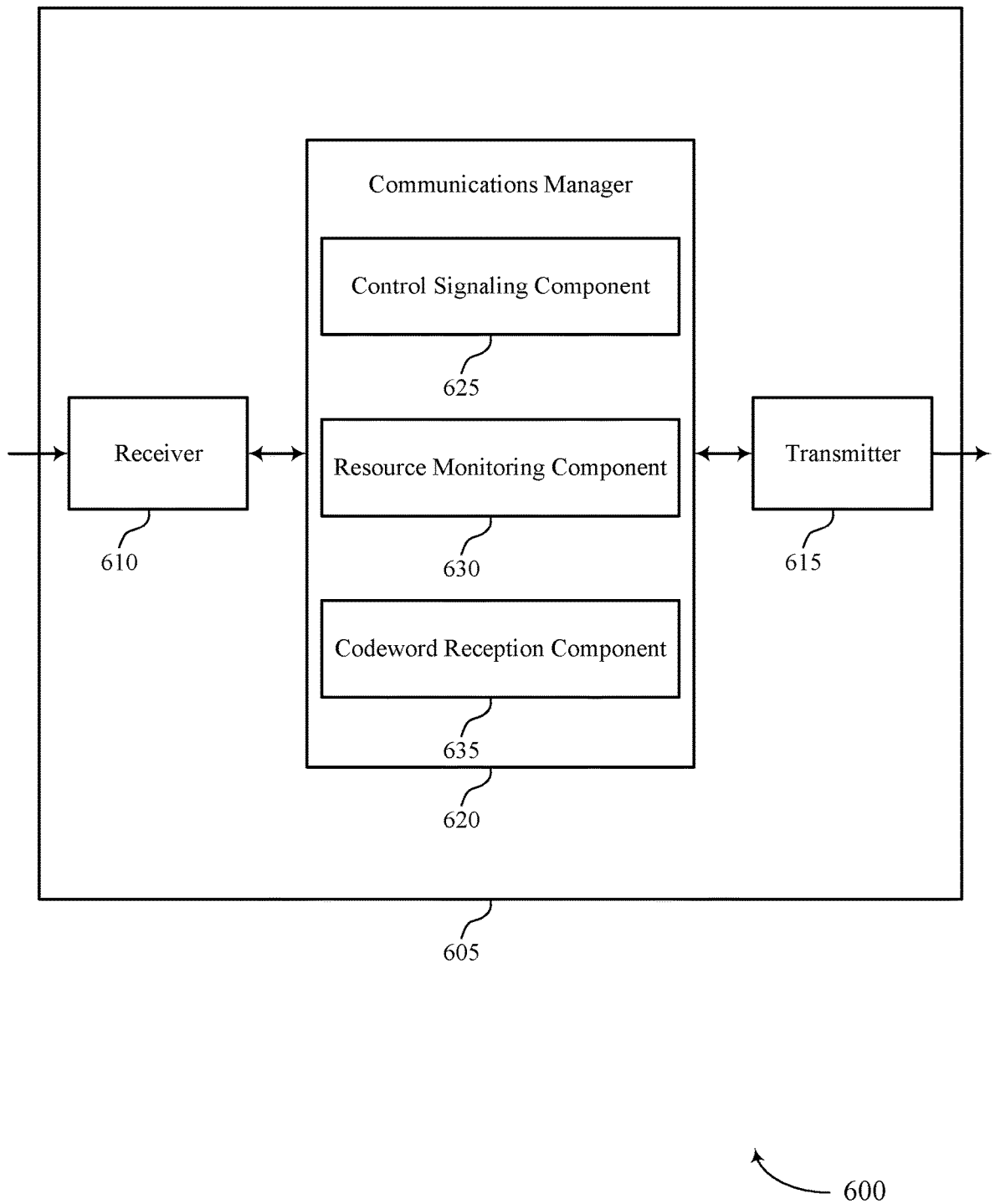

FIG. 6 shows a block diagram 600 of a device 605 that supports multiple modulation and coding scheme tables for multiple codewords in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to multiple modulation and coding scheme tables for multiple codewords). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to multiple modulation and coding scheme tables for multiple codewords). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of multiple modulation and coding scheme tables for multiple codewords as described herein. For example, the communications manager 620 may include a control signaling component 625, a resource monitoring component 630, a codeword reception component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. The control signaling component 625 may be configured as or otherwise support a means for receiving, from a network entity, a control message that indicates a first modulation and coding scheme value and a first resource associated with a first codeword and a second modulation and coding scheme value and a second resource associated with a second codeword. The resource monitoring component 630 may be configured as or otherwise support a means for monitoring, based on the control message, the first resource for the first codeword in accordance with one or more first parameters determined by indexing a first modulation and coding scheme table using the first modulation and coding scheme value. The resource monitoring component 630 may be configured as or otherwise support a means for monitoring, based on the control message, the second resource for the second codeword in accordance with one or more second parameters determined by indexing one of the first modulation and coding scheme table using the second modulation and coding scheme value or a second modulation and coding scheme table using the second modulation and coding scheme value. The codeword reception component 635 may be configured as or otherwise support a means for decoding the first codeword and the second codeword based on monitoring the first resource and the second resource.

Figure 7:
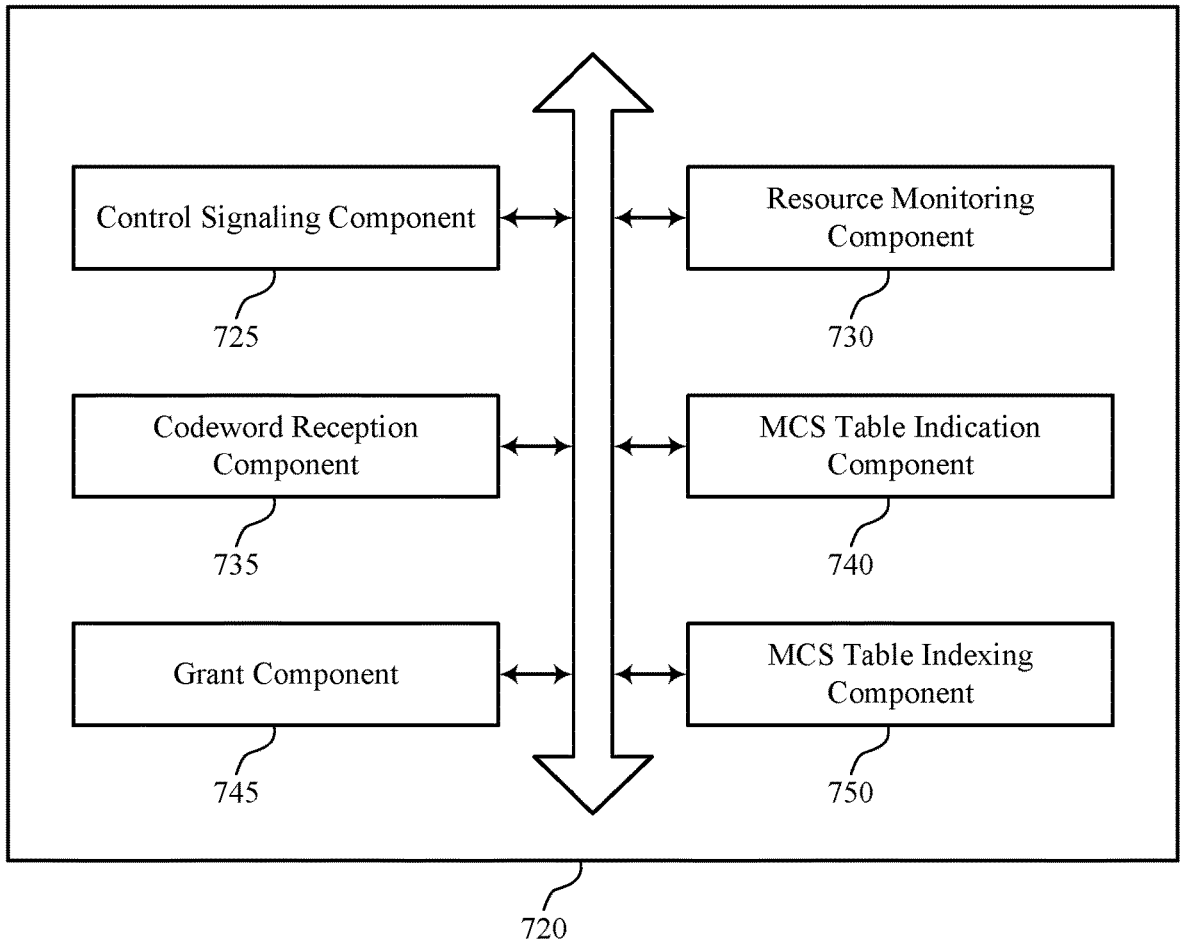
FIG. 7 shows a block diagram of a communications manager that supports multiple modulation and coding scheme tables for multiple codewords in accordance with one or more aspects of the present disclosure.

FIG. 7 shows a block diagram 700 of a communications manager 720 that supports multiple modulation and coding scheme tables for multiple codewords in accordance with one or more aspects of the present disclosure. The communications manager 720 may be an example of aspects of a communications manager 520, a communications manager 620, or both, as described herein. The communications manager 720, or various components thereof, may be an example of means for performing various aspects of multiple modulation and coding scheme tables for multiple codewords as described herein. For example, the communications manager 720 may include a control signaling component 725, a resource monitoring component 730, a codeword reception component 735, an MCS table indication component 740, a grant component 745, an MCS table indexing component 750, or any combination thereof. Each of these components may communicate, directly or indirectly, with one another (e.g., via one or more buses).

Additionally, or alternatively, the communications manager 720 may support wireless communication at a UE in accordance with examples as disclosed herein. The control signaling component 725 may be configured as or otherwise support a means for receiving, from a network entity, a control message that indicates a first modulation and coding scheme value and a first resource associated with a first codeword and a second modulation and coding scheme value and a second resource associated with a second codeword. The resource monitoring component 730 may be configured as or otherwise support a means for monitoring, based on the control message, the first resource for the first codeword in accordance with one or more first parameters determined by indexing a first modulation and coding scheme table using the first modulation and coding scheme value. In some examples, the resource monitoring component 730 may be configured as or otherwise support a means for monitoring, based on the control message, the second resource for the second codeword in accordance with one or more second parameters determined by indexing one of the first modulation and coding scheme table using the second modulation and coding scheme value or a second modulation and coding scheme table using the second modulation and coding scheme value. The codeword reception component 735 may be configured as or otherwise support a means for decoding the first codeword and the second codeword based on monitoring the first resource and the second resource.

In some examples, the MCS table indication component 740 may be configured as or otherwise support a means for receiving, from the network entity, an indication of the first modulation and coding scheme table and the second modulation and coding scheme table. In some examples, the grant component 745 may be configured as or otherwise support a means for receiving the control message including a first grant scheduling transmission of a first physical downlink shared channel message including the first codeword and the second codeword.

In some examples, the MCS table indication component 740 may be configured as or otherwise support a means for receiving, from the network entity, an indication of a third modulation and coding scheme table. In some examples, the grant component 745 may be configured as or otherwise support a means for receiving a second grant scheduling transmission of a third codeword and indicates a third modulation and coding scheme value associated with the third codeword. In some examples, the codeword reception component 735 may be configured as or otherwise support a means for receiving, from the network entity in accordance with the second grant, the third codeword based on indexing the third modulation and coding scheme table using the third modulation and coding scheme value.

In some examples, the control signaling component 725 may be configured as or otherwise support a means for receiving the control message that is a downlink control information message that schedules transmission of the first codeword and the second codeword. In some examples, the MCS table indexing component 750 may be configured as or otherwise support a means for indexing the first modulation and coding scheme table, the second modulation and coding scheme table, or both, based on a format of the downlink control information message.

In some examples, the control signaling component 725 may be configured as or otherwise support a means for receiving, from the network entity, control signaling indicating the second modulation and coding scheme table and a third modulation and coding scheme table. In some examples, the control signaling component 725 may be configured as or otherwise support a means for receiving the control message including a grant that schedules transmission of the first codeword and the second codeword and that includes cyclic redundancy check information that is scrambled with a modulation and coding scheme cell radio network temporary identifier. In some examples, the codeword reception component 735 may be configured as or otherwise support a means for receiving the first codeword based on indexing the first modulation and coding scheme table in response to the cyclic redundancy check information being scrambled with the modulation and coding scheme cell radio network temporary identifier. In some examples, the codeword reception component 735 may be configured as or otherwise support a means for receiving the second codeword based on indexing the first modulation and coding scheme table in response to the cyclic redundancy check information being scrambled with the modulation and coding scheme cell radio network temporary identifier.

In some examples, the control signaling component 725 may be configured as or otherwise support a means for receiving, from the network entity, control signaling indicating the second modulation and coding scheme table and a third modulation and coding scheme table. In some examples, the control signaling component 725 may be configured as or otherwise support a means for receiving the control message including a grant that schedules transmission of the first codeword and the second codeword and that includes cyclic redundancy check information that is scrambled with a modulation and coding scheme cell radio network temporary identifier. In some examples, the codeword reception component 735 may be configured as or otherwise support a means for receiving the first codeword based on indexing the first modulation and coding scheme table in response to the cyclic redundancy check information being scrambled with the modulation and coding scheme cell radio network temporary identifier. In some examples, the codeword reception component 735 may be configured as or otherwise support a means for receiving the second codeword based on indexing the second modulation and coding scheme table in response to the cyclic redundancy check information being scrambled with the modulation and coding scheme cell radio network temporary identifier.

In some examples, the control signaling component 725 may be configured as or otherwise support a means for receiving the control message including a grant that schedules transmission of the first codeword and the second codeword and that includes cyclic redundancy check information that is scrambled with a modulation and coding scheme cell radio network temporary identifier associated with multiple modulation and coding scheme tables. In some examples, the codeword reception component 735 may be configured as or otherwise support a means for receiving the first codeword based on indexing the first modulation and coding scheme table in response to the cyclic redundancy check information being scrambled with the modulation and coding scheme cell radio network temporary identifier. In some examples, the codeword reception component 735 may be configured as or otherwise support a means for receiving the second codeword based on indexing the second modulation and coding scheme table in response to the cyclic redundancy check information being scrambled with the modulation and coding scheme cell radio network temporary identifier.

In some examples, the control signaling component 725 may be configured as or otherwise support a means for receiving the control message including a grant that schedules transmission of the first codeword and the second codeword and that includes a field with a value that indicates that the UE is to receive the first codeword and the second codeword using different modulation and coding scheme tables. In some examples, the codeword reception component 735 may be configured as or otherwise support a means for receiving the first codeword based on indexing the first modulation and coding scheme table in accordance with the value. In some examples, the codeword reception component 735 may be configured as or otherwise support a means for receiving the second codeword based on indexing the second modulation and coding scheme table in accordance with the value.

In some examples, the control signaling component 725 may be configured as or otherwise support a means for receiving the control message including a grant that schedules transmission of the first codeword and the second codeword and that includes a field with a value that indicates that the UE is to receive the first codeword and the second codeword using a same modulation and coding scheme table. In some examples, the codeword reception component 735 may be configured as or otherwise support a means for receiving the first codeword based on indexing the first modulation and coding scheme table in accordance with the value. In some examples, the codeword reception component 735 may be configured as or otherwise support a means for receiving the second codeword based on indexing the first modulation and coding scheme table in accordance with the value.

In some examples, the first codeword is a common codeword that is to be decoded by the UE and one or more additional UEs and the second codeword is a private codeword that is to be decoded by the UE.

In some examples, the second codeword is a common codeword that is to be decoded by the UE and one or more additional UEs and the first codeword is a private codeword that is to be decoded by the UE.

In some examples, one or more modulation and coding schemes of the first modulation and coding scheme table have a smaller maximum modulation order, or a smaller spectral efficiency, or both, than one or more modulation and coding schemes of the second modulation and coding scheme table.

Figure 8:
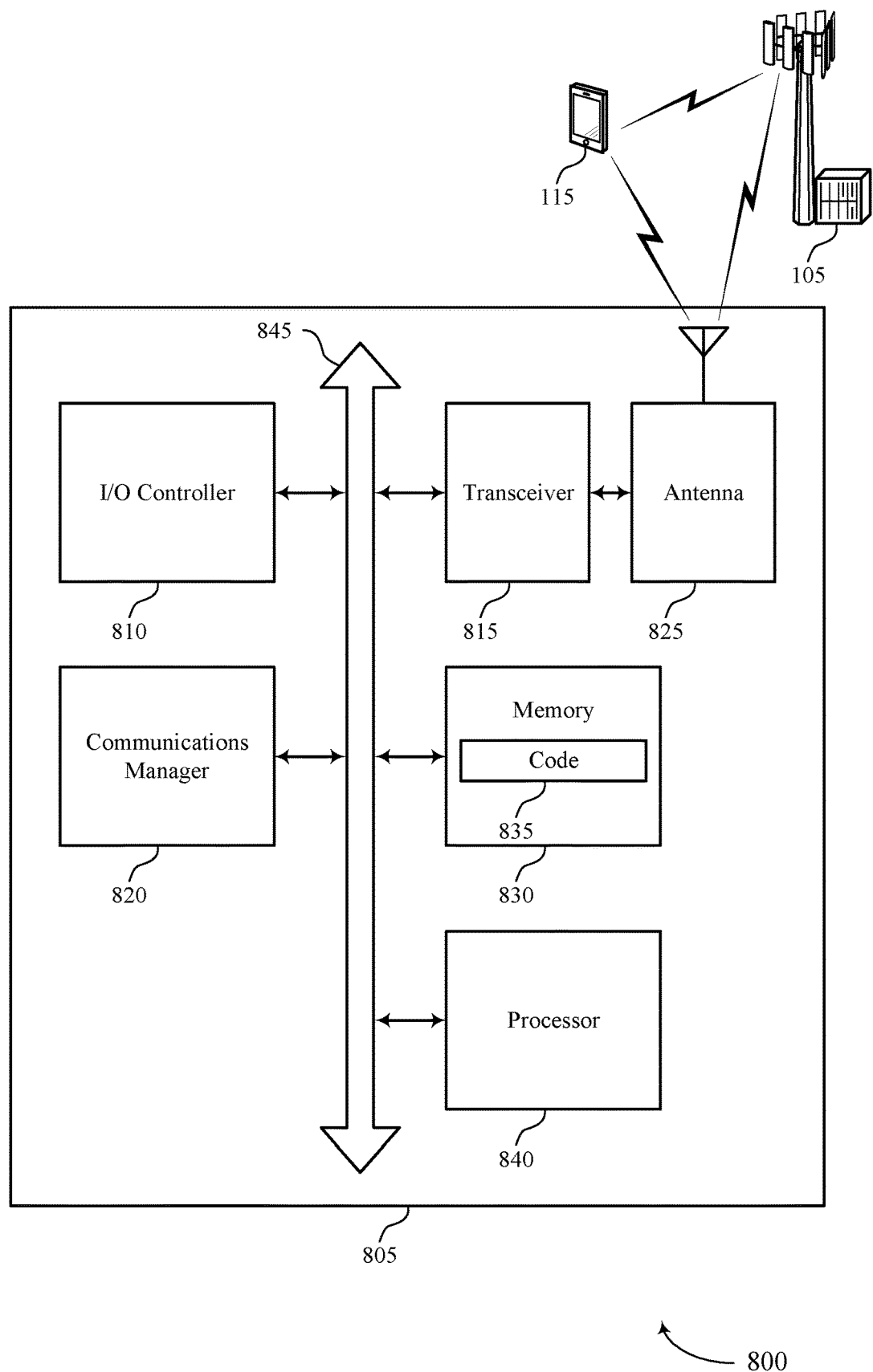
FIG. 8 shows a diagram of a system including a device that supports multiple modulation and coding scheme tables for multiple codewords in accordance with one or more aspects of the present disclosure.

FIG. 8 shows a diagram of a system 800 including a device 805 that supports multiple modulation and coding scheme tables for multiple codewords in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting multiple modulation and coding scheme tables for multiple codewords). For example, the device 805 or a component of the device 805 may include a processor 840 and memory 830 coupled with or to the processor 840, the processor 840 and memory 830 configured to perform various functions described herein.

Additionally, or alternatively, the communications manager 820 may support wireless communication at a UE in accordance with examples as disclosed herein. For example, the communications manager 820 may be configured as or otherwise support a means for receiving, from a network entity, a control message that indicates a first modulation and coding scheme value and a first resource associated with a first codeword and a second modulation and coding scheme value and a second resource associated with a second codeword. The communications manager 820 may be configured as or otherwise support a means for monitoring, based on the control message, the first resource for the first codeword in accordance with one or more first parameters determined by indexing a first modulation and coding scheme table using the first modulation and coding scheme value. The communications manager 820 may be configured as or otherwise support a means for monitoring, based on the control message, the second resource for the second codeword in accordance with one or more second parameters determined by indexing one of the first modulation and coding scheme table using the second modulation and coding scheme value or a second modulation and coding scheme table using the second modulation and coding scheme value. The communications manager 820 may be configured as or otherwise support a means for decoding the first codeword and the second codeword based on monitoring the first resource and the second resource.

By including or configuring the communications manager 820 in accordance with examples as described herein, the device 805 may support techniques for improved communication reliability, reduced latency, improved user experience related to reduced processing, reduced power consumption, more efficient utilization of communication resources, improved coordination between devices, longer battery life, improved utilization of processing capability, or any combination thereof.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of multiple modulation and coding scheme tables for multiple codewords as described herein, or the processor 840 and the memory 830 may be otherwise configured to perform or support such operations.

Figure 9:
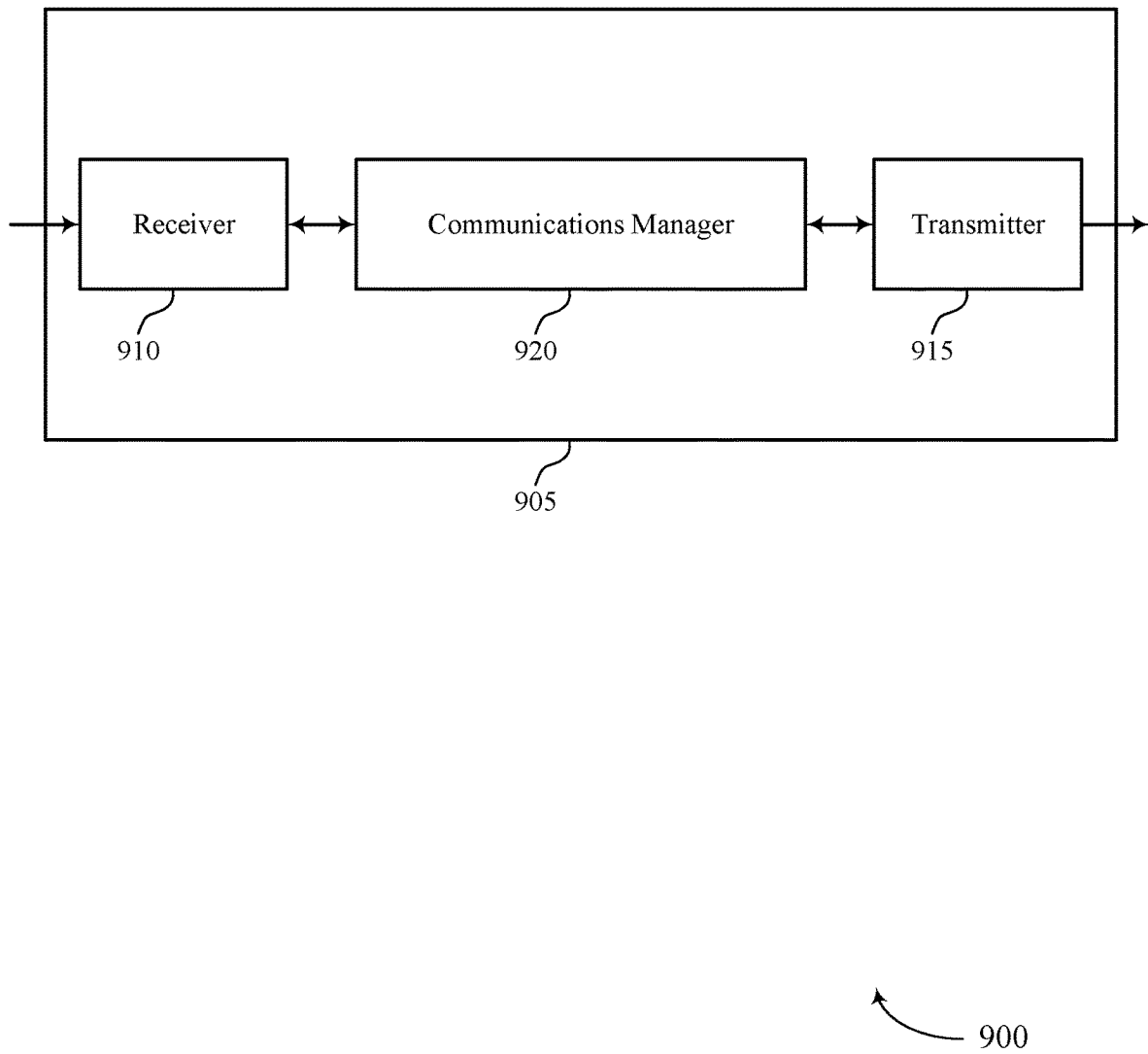
FIGS. 9 and 10 show block diagrams of devices that support multiple modulation and coding scheme tables for multiple codewords in accordance with one or more aspects of the present disclosure.

FIG. 9 shows a block diagram 900 of a device 905 that supports multiple modulation and coding scheme tables for multiple codewords in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of multiple modulation and coding scheme tables for multiple codewords as described herein.

For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

Additionally, or alternatively, the communications manager 920 may support wireless communication at a network entity in accordance with examples as disclosed herein. For example, the communications manager 920 may be configured as or otherwise support a means for transmitting, to a UE, a control message that indicates a first modulation and coding scheme value and a first resource associated with a first codeword and a second modulation and coding scheme value and a second resource associated with a second codeword. The communications manager 920 may be configured as or otherwise support a means for generating the first codeword in accordance with one or more first parameters determined by indexing a first modulation and coding scheme table using the first modulation and coding scheme value. The communications manager 920 may be configured as or otherwise support a means for generating the second codeword in accordance with one or more second parameters determined by indexing one of the first modulation and coding scheme table using the second modulation and coding scheme value or a second modulation and coding scheme table using the second modulation and coding scheme value. The communications manager 920 may be configured as or otherwise support a means for transmitting, to the UE in accordance with the control message, the first codeword via the first resource and the second codeword via the second resource.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reduced processing, reduced power consumption, more efficient utilization of communication resources, or any combination thereof.

Figure 10:
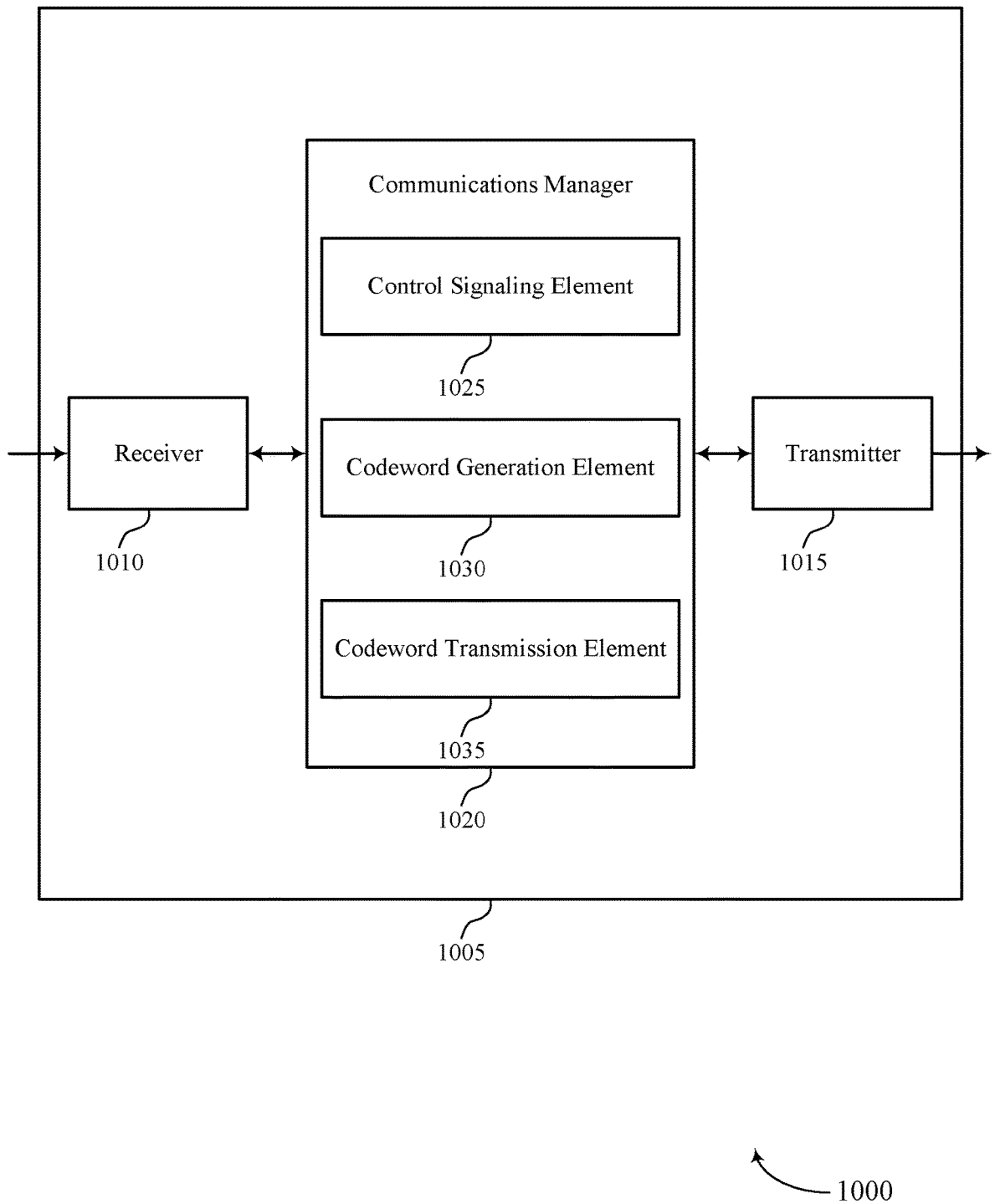

FIG. 10 shows a block diagram 1000 of a device 1005 that supports multiple modulation and coding scheme tables for multiple codewords in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of multiple modulation and coding scheme tables for multiple codewords as described herein. For example, the communications manager 1020 may include a control signaling element 1025, a codeword generation element 1030, a codeword transmission element 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. The control signaling element 1025 may be configured as or otherwise support a means for transmitting, to a UE, a control message that indicates a first modulation and coding scheme value and a first resource associated with a first codeword and a second modulation and coding scheme value and a second resource associated with a second codeword. The codeword generation element 1030 may be configured as or otherwise support a means for generating the first codeword in accordance with one or more first parameters determined by indexing a first modulation and coding scheme table using the first modulation and coding scheme value. The codeword generation element 1030 may be configured as or otherwise support a means for generating the second codeword in accordance with one or more second parameters determined by indexing one of the first modulation and coding scheme table using the second modulation and coding scheme value or a second modulation and coding scheme table using the second modulation and coding scheme value. The codeword transmission element 1035 may be configured as or otherwise support a means for transmitting, to the UE in accordance with the control message, the first codeword via the first resource and the second codeword via the second resource.

Figure 11:
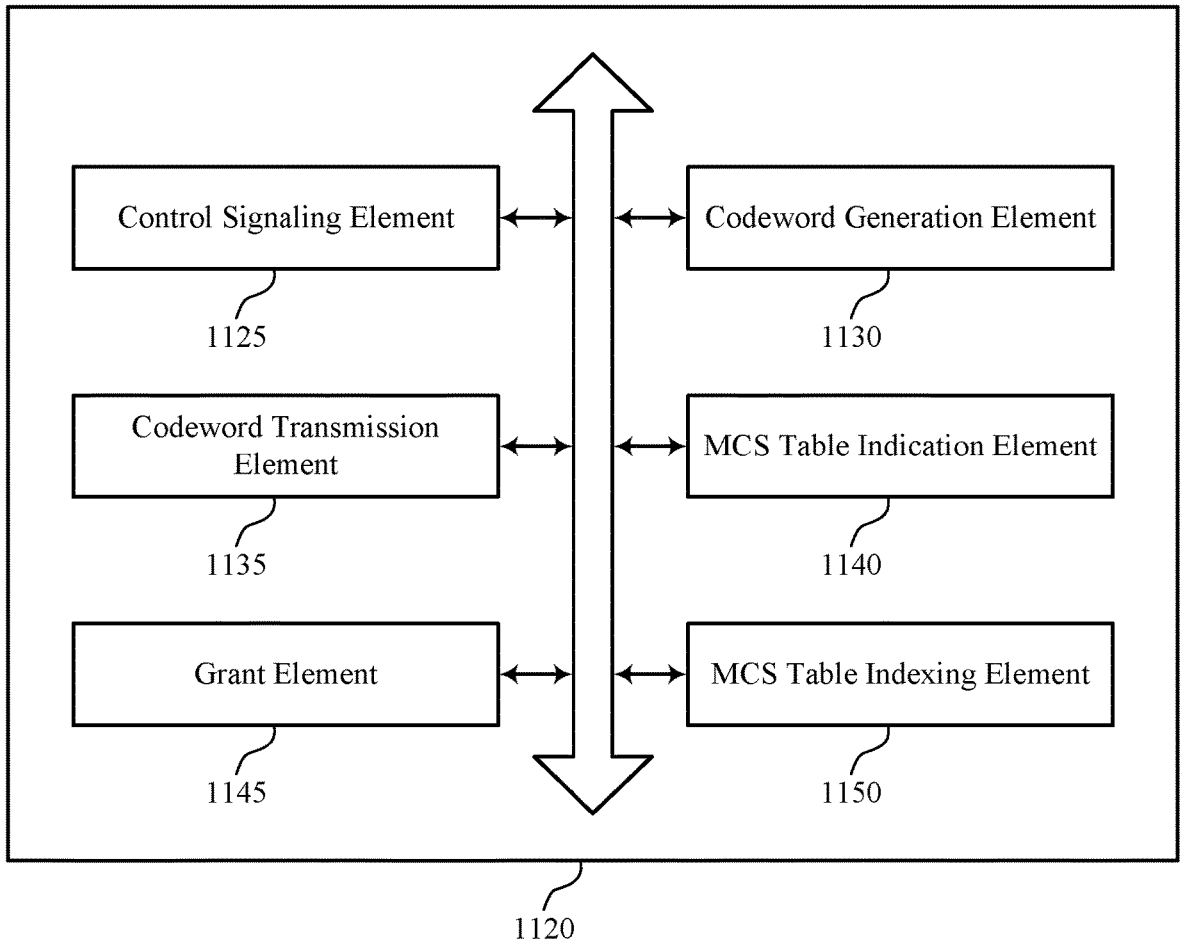
FIG. 11 shows a block diagram of a communications manager that supports multiple modulation and coding scheme tables for multiple codewords in accordance with one or more aspects of the present disclosure.

FIG. 11 shows a block diagram 1100 of a communications manager 1120 that supports multiple modulation and coding scheme tables for multiple codewords in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of multiple modulation and coding scheme tables for multiple codewords as described herein. For example, the communications manager 1120 may include a control signaling element 1125, a codeword generation element 1130, a codeword transmission element 1135, an MCS table indication element 1140, a grant element 1145, an MCS table indexing element 1150, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

Additionally, or alternatively, the communications manager 1120 may support wireless communication at a network entity in accordance with examples as disclosed herein. The control signaling element 1125 may be configured as or otherwise support a means for transmitting, to a UE, a control message that indicates a first modulation and coding scheme value and a first resource associated with a first codeword and a second modulation and coding scheme value and a second resource associated with a second codeword. The codeword generation element 1130 may be configured as or otherwise support a means for generating the first codeword in accordance with one or more first parameters determined by indexing a first modulation and coding scheme table using the first modulation and coding scheme value. In some examples, the codeword generation element 1130 may be configured as or otherwise support a means for generating the second codeword in accordance with one or more second parameters determined by indexing one of the first modulation and coding scheme table using the second modulation and coding scheme value or a second modulation and coding scheme table using the second modulation and coding scheme value. The codeword transmission element 1135 may be configured as or otherwise support a means for transmitting, to the UE in accordance with the control message, the first codeword via the first resource and the second codeword via the second resource.

In some examples, the MCS table indication element 1140 may be configured as or otherwise support a means for transmitting, to the UE, an indication of the first modulation and coding scheme table and the second modulation and coding scheme table. In some examples, the grant element 1145 may be configured as or otherwise support a means for transmitting the control message including a first grant scheduling transmission of a first physical downlink shared channel message including the first codeword and the second codeword.

In some examples, the MCS table indication element 1140 may be configured as or otherwise support a means for transmitting, to the UE, an indication of a third modulation and coding scheme table. In some examples, the grant element 1145 may be configured as or otherwise support a means for transmitting a second grant scheduling transmission of a third codeword and indicates a third modulation and coding scheme value associated with the third codeword. In some examples, the codeword transmission element 1135 may be configured as or otherwise support a means for transmitting, to the UE in accordance with the second grant, the third codeword based on indexing the third modulation and coding scheme table using the third modulation and coding scheme value.

In some examples, the control signaling element 1125 may be configured as or otherwise support a means for transmitting the control message that is a downlink control information message that schedules transmission of the first codeword and the second codeword. In some examples, the MCS table indexing element 1150 may be configured as or otherwise support a means for indexing the first modulation and coding scheme table, the second modulation and coding scheme table, or both, based on a format of the downlink control information message.

In some examples, the control signaling element 1125 may be configured as or otherwise support a means for transmitting, to the UE, control signaling indicating the second modulation and coding scheme table and a third modulation and coding scheme table. In some examples, the control signaling element 1125 may be configured as or otherwise support a means for transmitting the control message including a grant that schedules transmission of the first codeword and the second codeword and that includes cyclic redundancy check information that is scrambled with a modulation and coding scheme cell radio network temporary identifier. In some examples, the codeword transmission element 1135 may be configured as or otherwise support a means for transmitting the first codeword based on indexing the first modulation and coding scheme table in response to the cyclic redundancy check information being scrambled with the modulation and coding scheme cell radio network temporary identifier. In some examples, the codeword transmission element 1135 may be configured as or otherwise support a means for transmitting the second codeword based on indexing the first modulation and coding scheme table in response to the cyclic redundancy check information being scrambled with the modulation and coding scheme cell radio network temporary identifier.

In some examples, the control signaling element 1125 may be configured as or otherwise support a means for transmitting, to the UE, control signaling indicating the second modulation and coding scheme table and a third modulation and coding scheme table. In some examples, the control signaling element 1125 may be configured as or otherwise support a means for transmitting the control message including a grant that schedules transmission of the first codeword and the second codeword and that includes cyclic redundancy check information that is scrambled with a modulation and coding scheme cell radio network temporary identifier. In some examples, the codeword transmission element 1135 may be configured as or otherwise support a means for transmitting the first codeword based on indexing the first modulation and coding scheme table in response to the cyclic redundancy check information being scrambled with the modulation and coding scheme cell radio network temporary identifier. In some examples, the codeword transmission element 1135 may be configured as or otherwise support a means for transmitting the second codeword based on indexing the second modulation and coding scheme table in response to the cyclic redundancy check information being scrambled with the modulation and coding scheme cell radio network temporary identifier.

In some examples, the control signaling element 1125 may be configured as or otherwise support a means for transmitting the control message including a grant that schedules transmission of the first codeword and the second codeword and that includes cyclic redundancy check information that is scrambled with a modulation and coding scheme cell radio network temporary identifier associated with multiple modulation and coding scheme tables. In some examples, the codeword transmission element 1135 may be configured as or otherwise support a means for transmitting the first codeword based on indexing the first modulation and coding scheme table in response to the cyclic redundancy check information being scrambled with the modulation and coding scheme cell radio network temporary identifier. In some examples, the codeword transmission element 1135 may be configured as or otherwise support a means for transmitting the second codeword based on indexing the second modulation and coding scheme table in response to the cyclic redundancy check information being scrambled with the modulation and coding scheme cell radio network temporary identifier.

In some examples, the control signaling element 1125 may be configured as or otherwise support a means for transmitting the control message including a grant that schedules transmission of the first codeword and the second codeword and that includes a field with a value that indicates that the UE is to receive the first codeword and the second codeword using different modulation and coding scheme tables. In some examples, the codeword transmission element 1135 may be configured as or otherwise support a means for transmitting the first codeword based on indexing the first modulation and coding scheme table in accordance with the value. In some examples, the codeword transmission element 1135 may be configured as or otherwise support a means for transmitting the second codeword based on indexing the second modulation and coding scheme table in accordance with the value.

In some examples, the control signaling element 1125 may be configured as or otherwise support a means for transmitting the control message including a grant that schedules transmission of the first codeword and the second codeword and that includes a field with a value that indicates that the UE is to receive the first codeword and the second codeword using a same modulation and coding scheme table. In some examples, the codeword transmission element 1135 may be configured as or otherwise support a means for transmitting the first codeword based on indexing the first modulation and coding scheme table in accordance with the value. In some examples, the codeword transmission element 1135 may be configured as or otherwise support a means for transmitting the second codeword based on indexing the first modulation and coding scheme table in accordance with the value.

In some examples, the first codeword is a common codeword that is to be decoded by the UE and one or more additional UEs and the second codeword is a private codeword that is to be decoded by the UE.

In some examples, the second codeword is a common codeword that is to be decoded by the UE and one or more additional UEs and the first codeword is a private codeword that is to be decoded by the UE.

In some examples, one or more modulation and coding schemes of the first modulation and coding scheme table have a smaller maximum modulation order, or a smaller spectral efficiency, or both, than one or more modulation and coding schemes of the second modulation and coding scheme table.

Figure 12:
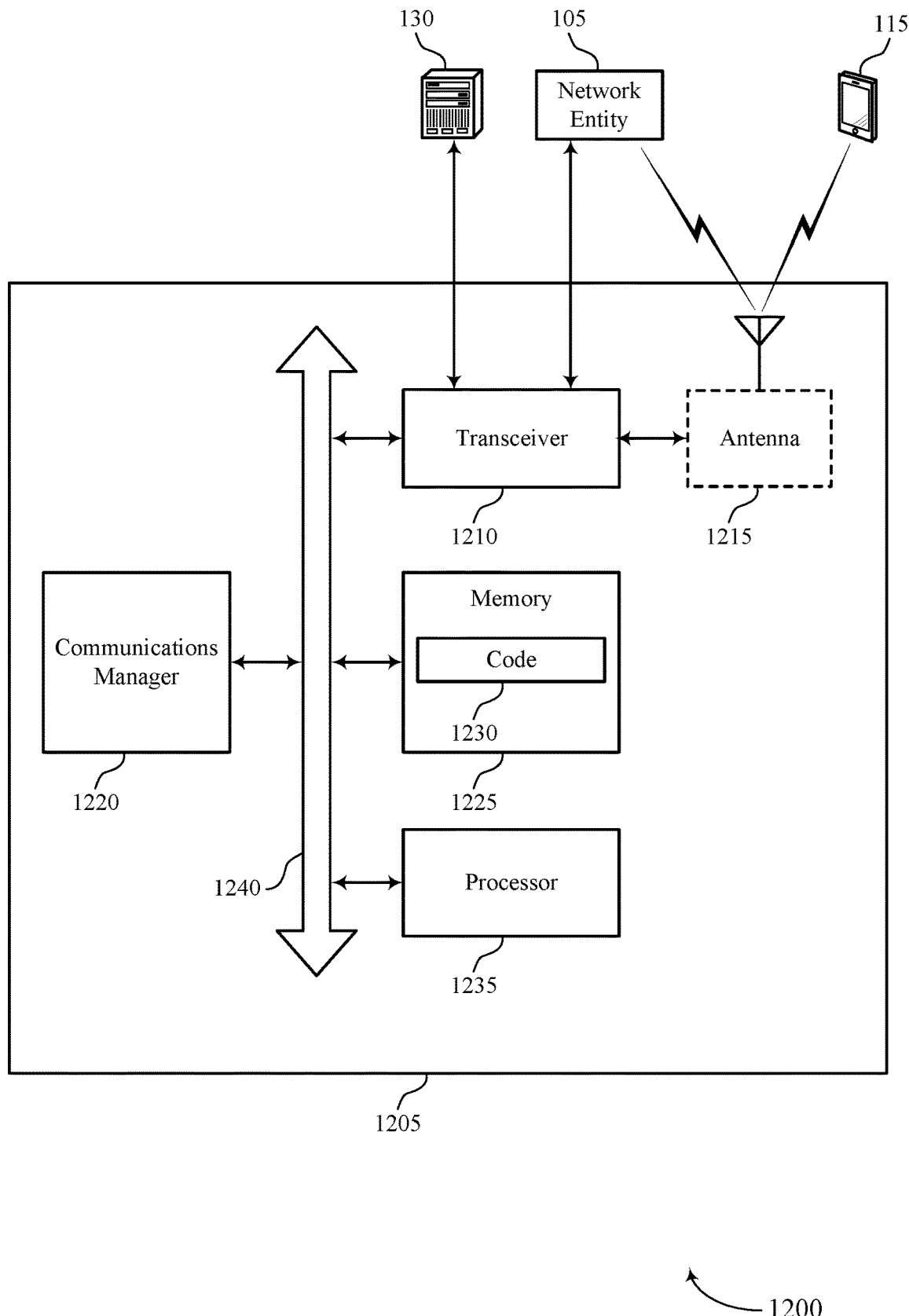
FIG. 12 shows a diagram of a system including a device that supports multiple modulation and coding scheme tables for multiple codewords in accordance with one or more aspects of the present disclosure.

FIG. 12 shows a diagram of a system 1200 including a device 1205 that supports multiple modulation and coding scheme tables for multiple codewords in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. The transceiver 1210, or the transceiver 1210 and one or more antennas 1215 or wired interfaces, where applicable, may be an example of a transmitter 915, a transmitter 1015, a receiver 910, a receiver 1010, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting multiple modulation and coding scheme tables for multiple codewords). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

Additionally, or alternatively, the communications manager 1220 may support wireless communication at a network entity in accordance with examples as disclosed herein. For example, the communications manager 1220 may be configured as or otherwise support a means for transmitting, to a UE, a control message that indicates a first modulation and coding scheme value and a first resource associated with a first codeword and a second modulation and coding scheme value and a second resource associated with a second codeword. The communications manager 1220 may be configured as or otherwise support a means for generating the first codeword in accordance with one or more first parameters determined by indexing a first modulation and coding scheme table using the first modulation and coding scheme value. The communications manager 1220 may be configured as or otherwise support a means for generating the second codeword in accordance with one or more second parameters determined by indexing one of the first modulation and coding scheme table using the second modulation and coding scheme value or a second modulation and coding scheme table using the second modulation and coding scheme value. The communications manager 1220 may be configured as or otherwise support a means for transmitting, to the UE in accordance with the control message, the first codeword via the first resource and the second codeword via the second resource.

By including or configuring the communications manager 1220 in accordance with examples as described herein, the device 1205 may support techniques for improved communication reliability, reduced latency, improved user experience related to reduced processing, reduced power consumption, more efficient utilization of communication resources, improved coordination between devices, longer battery life, improved utilization of processing capability, or any combination thereof.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the processor 1235, the memory 1225, the code 1230, the transceiver 1210, or any combination thereof. For example, the code 1230 may include instructions executable by the processor 1235 to cause the device 1205 to perform various aspects of multiple modulation and coding scheme tables for multiple codewords as described herein, or the processor 1235 and the memory 1225 may be otherwise configured to perform or support such operations.

Figure 13:
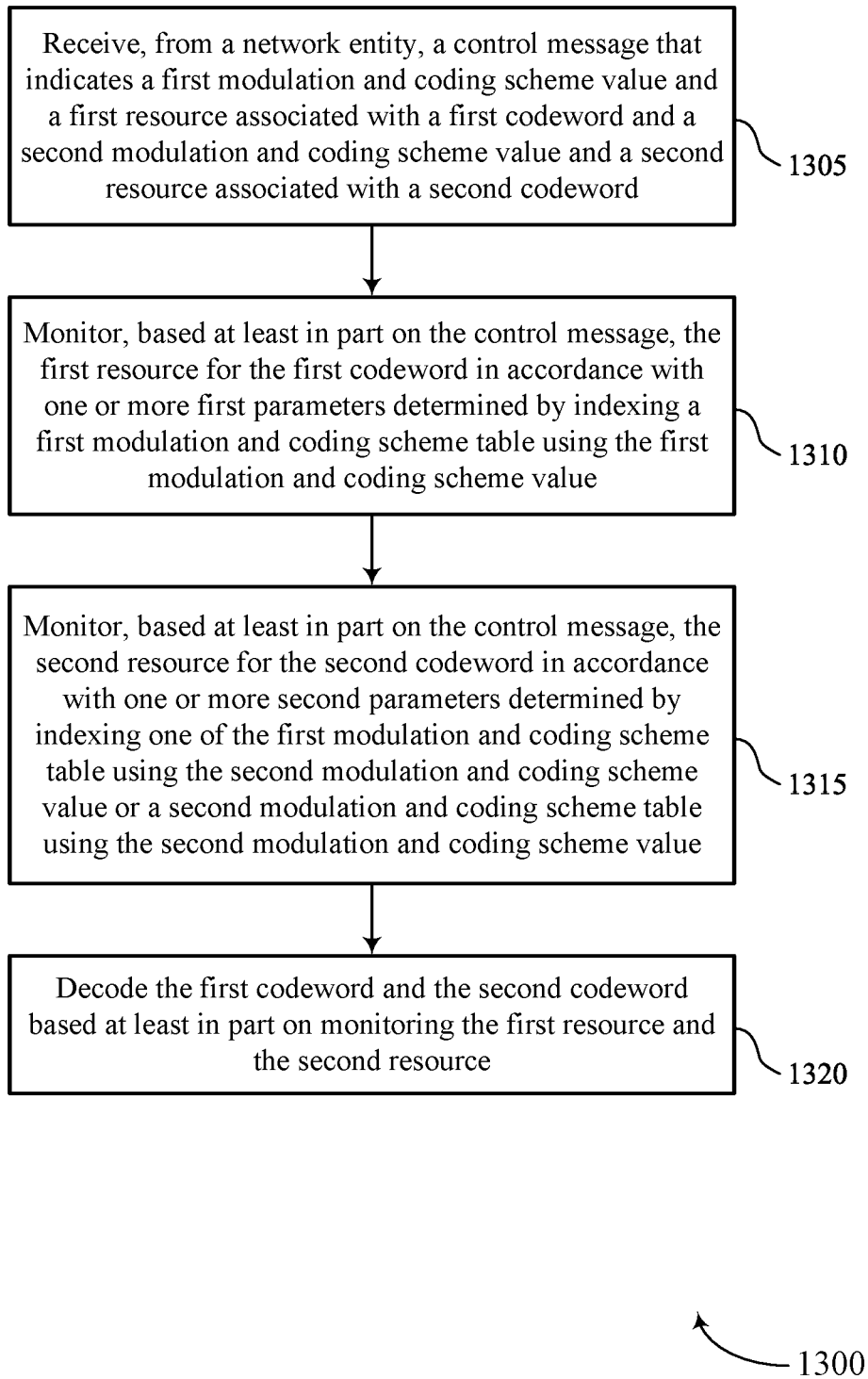
FIGS. 13 and 14 show flowcharts illustrating methods that support multiple modulation and coding scheme tables for multiple codewords in accordance with one or more aspects of the present disclosure.

FIG. 13 shows a flowchart illustrating a method 1300 that supports multiple modulation and coding scheme tables for multiple codewords in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving, from a network entity, a control message that indicates a first modulation and coding scheme value and a first resource associated with a first codeword and a second modulation and coding scheme value and a second resource associated with a second codeword. The operations of 1305 may be performed in accordance with examples as disclosed herein. In some examples, aspects of the operations of 1305 may be performed by a control signaling component 725 as described with reference to FIG. 7.

At 1310, the method may include monitoring, based on the control message, the first resource for the first codeword in accordance with one or more first parameters determined by indexing a first modulation and coding scheme table using the first modulation and coding scheme value. The operations of 1310 may be performed in accordance with examples as disclosed herein. In some examples, aspects of the operations of 1310 may be performed by a resource monitoring component 730 as described with reference to FIG. 7.

At 1315, the method may include monitoring, based on the control message, the second resource for the second codeword in accordance with one or more second parameters determined by indexing one of the first modulation and coding scheme table using the second modulation and coding scheme value or a second modulation and coding scheme table using the second modulation and coding scheme value. The operations of 1315 may be performed in accordance with examples as disclosed herein. In some examples, aspects of the operations of 1315 may be performed by a resource monitoring component 730 as described with reference to FIG. 7.

At 1320, the method may include decoding the first codeword and the second codeword based on monitoring the first resource and the second resource. The operations of 1320 may be performed in accordance with examples as disclosed herein. In some examples, aspects of the operations of 1320 may be performed by a codeword reception component 735 as described with reference to FIG. 7.

Figure 14:
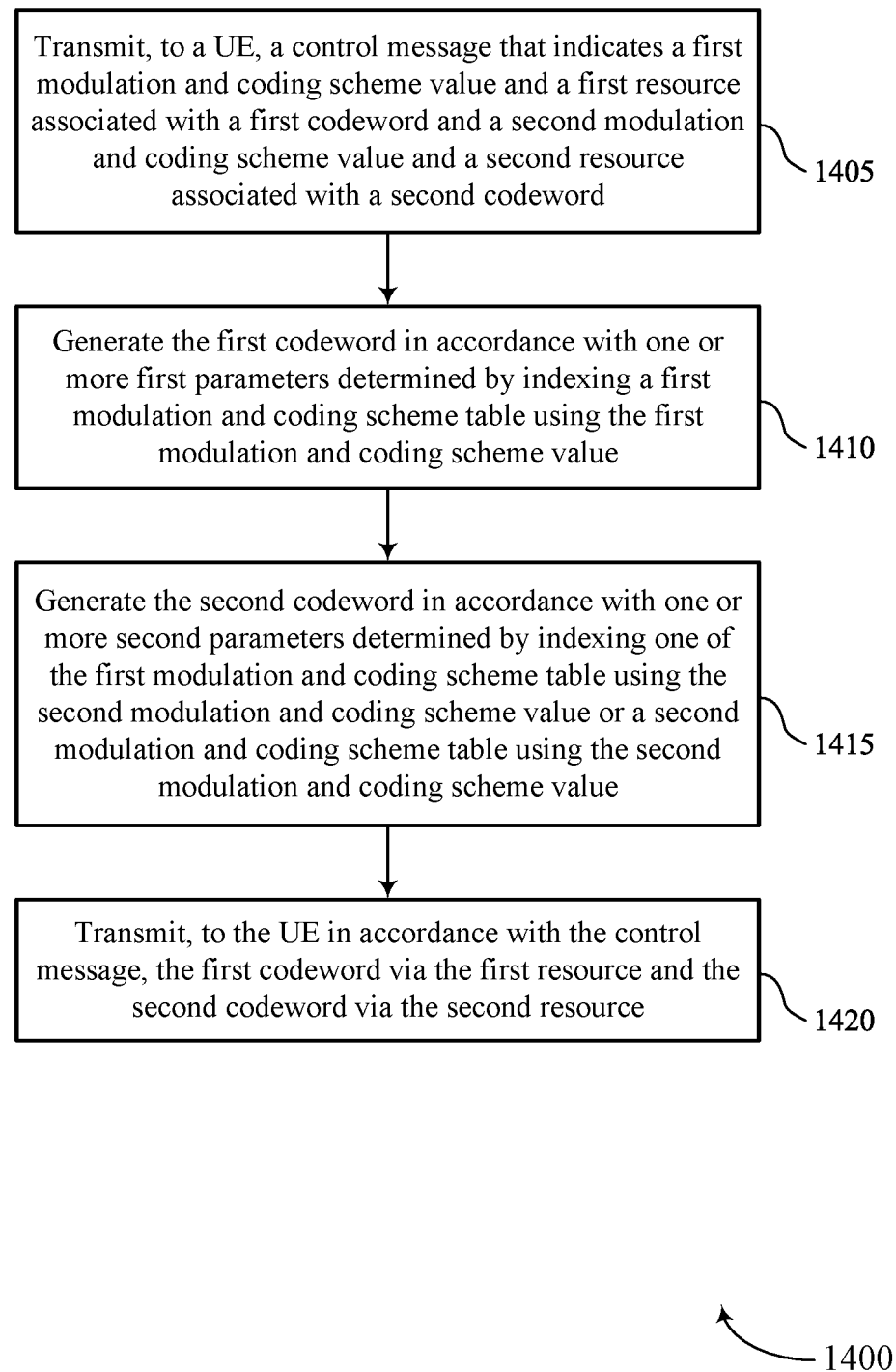

FIG. 14 shows a flowchart illustrating a method 1400 that supports multiple modulation and coding scheme tables for multiple codewords in accordance with one or more aspects of the present disclosure. The operations of the method 1400 may be implemented by a network entity or its components as described herein. For example, the operations of the method 1400 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1405, the method may include transmitting, to a UE, a control message that indicates a first modulation and coding scheme value and a first resource associated with a first codeword and a second modulation and coding scheme value and a second resource associated with a second codeword. The operations of 1405 may be performed in accordance with examples as disclosed herein. In some examples, aspects of the operations of 1405 may be performed by a control signaling element 1125 as described with reference to FIG. 11.

At 1410, the method may include generating the first codeword in accordance with one or more first parameters determined by indexing a first modulation and coding scheme table using the first modulation and coding scheme value. The operations of 1410 may be performed in accordance with examples as disclosed herein. In some examples, aspects of the operations of 1410 may be performed by a codeword generation element 1130 as described with reference to FIG. 11.

At 1415, the method may include generating the second codeword in accordance with one or more second parameters determined by indexing one of the first modulation and coding scheme table using the second modulation and coding scheme value or a second modulation and coding scheme table using the second modulation and coding scheme value. The operations of 1415 may be performed in accordance with examples as disclosed herein. In some examples, aspects of the operations of 1415 may be performed by a codeword generation element 1130 as described with reference to FIG. 11.

At 1420, the method may include transmitting, to the UE in accordance with the control message, the first codeword via the first resource and the second codeword via the second resource. The operations of 1420 may be performed in accordance with examples as disclosed herein. In some examples, aspects of the operations of 1420 may be performed by a codeword transmission element 1135 as described with reference to FIG. 11.

The following provides an overview of aspects of the present disclosure:

Aspect 1: A method for wireless communication at a UE, comprising: receiving, from a network entity, a control message that indicates a first modulation and coding scheme value and a first resource associated with a first codeword and a second modulation and coding scheme value and a second resource associated with a second codeword; monitoring, based at least in part on the control message, the first resource for the first codeword in accordance with one or more first parameters determined by indexing a first modulation and coding scheme table using the first modulation and coding scheme value; monitoring, based at least in part on the control message, the second resource for the second codeword in accordance with one or more second parameters determined by indexing one of the first modulation and coding scheme table using the second modulation and coding scheme value or a second modulation and coding scheme table using the second modulation and coding scheme value; and decoding the first codeword and the second codeword based at least in part on monitoring the first resource and the second resource.

Aspect 2: The method of aspect 1, further comprising: receiving, from the network entity, an indication of the first modulation and coding scheme table and the second modulation and coding scheme table; and receiving the control message comprising a first grant scheduling transmission of a first physical downlink shared channel message comprising the first codeword and the second codeword.

Aspect 3: The method of aspect 2, further comprising: receiving, from the network entity, an indication of a third modulation and coding scheme table; receiving a second grant scheduling transmission of a third codeword and indicates a third modulation and coding scheme value associated with the third codeword; and receiving, from the network entity in accordance with the second grant, the third codeword based at least in part on indexing the third modulation and coding scheme table using the third modulation and coding scheme value.

Aspect 4: The method of any of aspects 1 through 3, further comprising: receiving the control message that is a downlink control information message that schedules transmission of the first codeword and the second codeword; and indexing the first modulation and coding scheme table, the second modulation and coding scheme table, or both, based at least in part on a format of the downlink control information message.

Aspect 5: The method of any of aspects 1 through 4, further comprising: receiving, from the network entity, control signaling indicating the second modulation and coding scheme table and a third modulation and coding scheme table; receiving the control message comprising a grant that schedules transmission of the first codeword and the second codeword and that comprises cyclic redundancy check information that is scrambled with a modulation and coding scheme cell radio network temporary identifier; receiving the first codeword based at least in part on indexing the first modulation and coding scheme table in response to the cyclic redundancy check information being scrambled with the modulation and coding scheme cell radio network temporary identifier; and receiving the second codeword based at least in part on indexing the first modulation and coding scheme table in response to the cyclic redundancy check information being scrambled with the modulation and coding scheme cell radio network temporary identifier.

Aspect 6: The method of any of aspects 1 through 5, further comprising: receiving, from the network entity, control signaling indicating the second modulation and coding scheme table and a third modulation and coding scheme table; receiving the control message comprising a grant that schedules transmission of the first codeword and the second codeword and that comprises cyclic redundancy check information that is scrambled with a modulation and coding scheme cell radio network temporary identifier; receiving the first codeword based at least in part on indexing the first modulation and coding scheme table in response to the cyclic redundancy check information being scrambled with the modulation and coding scheme cell radio network temporary identifier; and receiving the second codeword based at least in part on indexing the second modulation and coding scheme table in response to the cyclic redundancy check information being scrambled with the modulation and coding scheme cell radio network temporary identifier.

Aspect 7: The method of any of aspects 1 through 6, further comprising: receiving the control message comprising a grant that schedules transmission of the first codeword and the second codeword and that comprises cyclic redundancy check information that is scrambled with a modulation and coding scheme cell radio network temporary identifier associated with multiple modulation and coding scheme tables; receiving the first codeword based at least in part on indexing the first modulation and coding scheme table in response to the cyclic redundancy check information being scrambled with the modulation and coding scheme cell radio network temporary identifier; and receiving the second codeword based at least in part on indexing the second modulation and coding scheme table in response to the cyclic redundancy check information being scrambled with the modulation and coding scheme cell radio network temporary identifier.

Aspect 8: The method of any of aspects 1 through 7, further comprising: receiving the control message comprising a grant that schedules transmission of the first codeword and the second codeword and that comprises a field with a value that indicates that the UE is to receive the first codeword and the second codeword using different modulation and coding scheme tables; receiving the first codeword based at least in part on indexing the first modulation and coding scheme table in accordance with the value; and receiving the second codeword based at least in part on indexing the second modulation and coding scheme table in accordance with the value.

Aspect 9: The method of any of aspects 1 through 8, further comprising: receiving the control message comprising a grant that schedules transmission of the first codeword and the second codeword and that comprises a field with a value that indicates that the UE is to receive the first codeword and the second codeword using a same modulation and coding scheme table; receiving the first codeword based at least in part on indexing the first modulation and coding scheme table in accordance with the value; and receiving the second codeword based at least in part on indexing the first modulation and coding scheme table in accordance with the value.

Aspect 10: The method of any of aspects 1 through 9, wherein the first codeword is a common codeword that is to be decoded by the UE and one or more additional UEs and the second codeword is a private codeword that is to be decoded by the UE.

Aspect 11: The method of any of aspects 1 through 10, wherein the second codeword is a common codeword that is to be decoded by the UE and one or more additional UEs and the first codeword is a private codeword that is to be decoded by the UE.

Aspect 12: The method of any of aspects 1 through 11, wherein one or more modulation and coding schemes of the first modulation and coding scheme table have a smaller maximum modulation order, or a smaller spectral efficiency, or both, than one or more modulation and coding schemes of the second modulation and coding scheme table.

Aspect 13: A method for wireless communication at a network entity, comprising: transmitting, to a UE, a control message that indicates a first modulation and coding scheme value and a first resource associated with a first codeword and a second modulation and coding scheme value and a second resource associated with a second codeword; generating the first codeword in accordance with one or more first parameters determined by indexing a first modulation and coding scheme table using the first modulation and coding scheme value; generating the second codeword in accordance with one or more second parameters determined by indexing one of the first modulation and coding scheme table using the second modulation and coding scheme value or a second modulation and coding scheme table using the second modulation and coding scheme value; and transmitting, to the UE in accordance with the control message, the first codeword via the first resource and the second codeword via the second resource.

Aspect 14: The method of aspect 13, further comprising: transmitting, to the UE, an indication of the first modulation and coding scheme table and the second modulation and coding scheme table; and transmitting the control message comprising a first grant scheduling transmission of a first physical downlink shared channel message comprising the first codeword and the second codeword.

Aspect 15: The method of aspect 14, further comprising: transmitting, to the UE, an indication of a third modulation and coding scheme table; transmitting a second grant scheduling transmission of a third codeword and indicates a third modulation and coding scheme value associated with the third codeword; and transmitting, to the UE in accordance with the second grant, the third codeword based at least in part on indexing the third modulation and coding scheme table using the third modulation and coding scheme value.

Aspect 16: The method of any of aspects 13 through 15, further comprising: transmitting the control message that is a downlink control information message that schedules transmission of the first codeword and the second codeword; and indexing the first modulation and coding scheme table, the second modulation and coding scheme table, or both, based at least in part on a format of the downlink control information message.

Aspect 17: The method of any of aspects 13 through 16, further comprising: transmitting, to the UE, control signaling indicating the second modulation and coding scheme table and a third modulation and coding scheme table; transmitting the control message comprising a grant that schedules transmission of the first codeword and the second codeword and that comprises cyclic redundancy check information that is scrambled with a modulation and coding scheme cell radio network temporary identifier; transmitting the first codeword based at least in part on indexing the first modulation and coding scheme table in response to the cyclic redundancy check information being scrambled with the modulation and coding scheme cell radio network temporary identifier; and transmitting the second codeword based at least in part on indexing the first modulation and coding scheme table in response to the cyclic redundancy check information being scrambled with the modulation and coding scheme cell radio network temporary identifier.

Aspect 18: The method of any of aspects 13 through 17, further comprising: transmitting, to the UE, control signaling indicating the second modulation and coding scheme table and a third modulation and coding scheme table; transmitting the control message comprising a grant that schedules transmission of the first codeword and the second codeword and that comprises cyclic redundancy check information that is scrambled with a modulation and coding scheme cell radio network temporary identifier; transmitting the first codeword based at least in part on indexing the first modulation and coding scheme table in response to the cyclic redundancy check information being scrambled with the modulation and coding scheme cell radio network temporary identifier; and transmitting the second codeword based at least in part on indexing the second modulation and coding scheme table in response to the cyclic redundancy check information being scrambled with the modulation and coding scheme cell radio network temporary identifier.

Aspect 19: The method of any of aspects 13 through 18, further comprising: transmitting the control message comprising a grant that schedules transmission of the first codeword and the second codeword and that comprises cyclic redundancy check information that is scrambled with a modulation and coding scheme cell radio network temporary identifier associated with of multiple modulation and coding scheme tables; transmitting the first codeword based at least in part on indexing the first modulation and coding scheme table in response to the cyclic redundancy check information being scrambled with the modulation and coding scheme cell radio network temporary identifier; and transmitting the second codeword based at least in part on indexing the second modulation and coding scheme table in response to the cyclic redundancy check information being scrambled with the modulation and coding scheme cell radio network temporary identifier.

Aspect 20: The method of any of aspects 13 through 19, further comprising: transmitting the control message comprising a grant that schedules transmission of the first codeword and the second codeword and that comprises a field with a value that indicates that the UE is to receive the first codeword and the second codeword using different modulation and coding scheme tables; transmitting the first codeword based at least in part on indexing the first modulation and coding scheme table in accordance with the value; and transmitting the second codeword based at least in part on indexing the second modulation and coding scheme table in accordance with the value.

Aspect 21: The method of any of aspects 13 through 20, further comprising: transmitting the control message comprising a grant that schedules transmission of the first codeword and the second codeword and that comprises a field with a value that indicates that the UE is to receive the first codeword and the second codeword using a same modulation and coding scheme table; transmitting the first codeword based at least in part on indexing the first modulation and coding scheme table in accordance with the value; and transmitting the second codeword based at least in part on indexing the first modulation and coding scheme table in accordance with the value.

Aspect 22: The method of any of aspects 13 through 21, wherein the first codeword is a common codeword that is to be decoded by the UE and one or more additional UEs and the second codeword is a private codeword that is to be decoded by the UE.

Aspect 23: The method of any of aspects 13 through 22, wherein the second codeword is a common codeword that is to be decoded by the UE and one or more additional UEs and the first codeword is a private codeword that is to be decoded by the UE.

Aspect 24: The method of any of aspects 13 through 23, wherein one or more modulation and coding schemes of the first modulation and coding scheme table have a smaller maximum modulation order, or a smaller spectral efficiency, or both, than one or more modulation and coding schemes of the second modulation and coding scheme table.

Aspect 25: An apparatus for wireless communication at a UE, comprising a processor; memory coupled with the processor; and instructions stored in the memory and executable by the processor to cause the apparatus to perform a method of any of aspects 1 through 12.

Aspect 26: An apparatus for wireless communication at a UE, comprising at least one means for performing a method of any of aspects 1 through 12.

Aspect 27: A non-transitory computer-readable medium storing code for wireless communication at a UE, the code comprising instructions executable by a processor to perform a method of any of aspects 1 through 12.

Aspect 28: An apparatus for wireless communication at a network entity, comprising a processor; memory coupled with the processor; and instructions stored in the memory and executable by the processor to cause the apparatus to perform a method of any of aspects 13 through 24.

Aspect 29: An apparatus for wireless communication at a network entity, comprising at least one means for performing a method of any of aspects 13 through 24.

Aspect 30: A non-transitory computer-readable medium storing code for wireless communication at a network entity, the code comprising instructions executable by a processor to perform a method of any of aspects 13 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:
   at least one processor; and
   at least one memory coupled with the at least one processor, the at least one memory storing instructions executable by the at least one processor to cause the UE to:
   receive a control message scheduling a physical downlink shared channel (PDSCH) transmission comprising a first codeword and a second codeword, the control message indicating a first modulation and coding scheme value and a first resource associated with the first codeword, and the control message indicating a second modulation and coding scheme value and a second resource associated with the second codeword;
   monitor, based at least in part on the control message, the first resource for the first codeword in accordance with one or more first parameters determined by indexing a first modulation and coding scheme table using the first modulation and coding scheme value;
   monitor, based at least in part on the control message, the second resource for the second codeword in accordance with one or more second parameters determined by indexing one of the first modulation and coding scheme table using the second modulation and coding scheme value or a second modulation and coding scheme table using the second modulation and coding scheme value; and
   decode the first codeword and the second codeword based at least in part on monitoring the first resource and the second resource.

2. The UE of claim 1, wherein the instructions are further executable by the at least one processor to cause the UE to:
   receive an indication of the first modulation and coding scheme table and the second modulation and coding scheme table; and
   receive the control message comprising a first grant scheduling the PDSCH transmission comprising the first codeword and the second codeword.

3. The UE of claim 2, wherein the instructions are further executable by the at least one processor to cause the UE to:
   receive an indication of a third modulation and coding scheme table;
   receive a second grant scheduling transmission of a third codeword and indicating a third modulation and coding scheme value associated with the third codeword; and
   receive, in accordance with the second grant, the third codeword based at least in part on indexing the third modulation and coding scheme table using the third modulation and coding scheme value.

4. The UE of claim 1, wherein the instructions are further executable by the at least one processor to cause the UE to:
   receive the control message that is a downlink control information message that schedules the PDSCH transmission comprising the first codeword and the second codeword; and
   index the first modulation and coding scheme table, the second modulation and coding scheme table, or both, based at least in part on a format of the downlink control information message.

5. The UE of claim 1, wherein the instructions are further executable by the at least one processor to cause the UE to:
   receive control signaling indicating the second modulation and coding scheme table and a third modulation and coding scheme table;
   receive the control message comprising a grant that schedules the PDSCH transmission comprising the first codeword and the second codeword and that comprises cyclic redundancy check information that is scrambled with a modulation and coding scheme cell radio network temporary identifier;
   receive the first codeword based at least in part on indexing the first modulation and coding scheme table in response to the cyclic redundancy check information being scrambled with the modulation and coding scheme cell radio network temporary identifier; and
   receive the second codeword based at least in part on indexing the first modulation and coding scheme table in response to the cyclic redundancy check information being scrambled with the modulation and coding scheme cell radio network temporary identifier.

6. The UE of claim 1, wherein the instructions are further executable by the at least one processor to cause the UE to:
   receive control signaling indicating the second modulation and coding scheme table and a third modulation and coding scheme table;
   receive the control message comprising a grant that schedules the PDSCH transmission comprising the first codeword and the second codeword and that comprises cyclic redundancy check information that is scrambled with a modulation and coding scheme cell radio network temporary identifier;
   receive the first codeword based at least in part on indexing the first modulation and coding scheme table in response to the cyclic redundancy check information being scrambled with the modulation and coding scheme cell radio network temporary identifier; and
   receive the second codeword based at least in part on indexing the second modulation and coding scheme table in response to the cyclic redundancy check information being scrambled with the modulation and coding scheme cell radio network temporary identifier.

7. The UE of claim 1, wherein the instructions are further executable by the at least one processor to cause the UE to:
   receive the control message comprising a grant that schedules the PDSCH transmission comprising the first codeword and the second codeword and that comprises cyclic redundancy check information that is scrambled with a modulation and coding scheme cell radio network temporary identifier associated with multiple modulation and coding scheme tables;
   receive the first codeword based at least in part on indexing the first modulation and coding scheme table in response to the cyclic redundancy check information being scrambled with the modulation and coding scheme cell radio network temporary identifier; and
receive the second codeword based at least in part on indexing the second modulation and coding scheme table in response to the cyclic redundancy check information being scrambled with the modulation and coding scheme cell radio network temporary identifier.

8. The UE of claim 1, wherein the instructions are further executable by the at least one processor to cause the UE to:
receive the control message comprising a grant that schedules the PDSCH transmission comprising the first codeword and the second codeword and that comprises a field with a value that indicates that the UE is to receive the first codeword and the second codeword using different modulation and coding scheme tables;
receive the first codeword based at least in part on indexing the first modulation and coding scheme table in accordance with the value; and
receive the second codeword based at least in part on indexing the second modulation and coding scheme table in accordance with the value.

9. The UE of claim 1, wherein the instructions are further executable by the at least one processor to cause the UE to:
receive the control message comprising a grant that schedules the PDSCH transmission comprising the first codeword and the second codeword and that comprises a field with a value that indicates that the UE is to receive the first codeword and the second codeword using a same modulation and coding scheme table;
receive the first codeword based at least in part on indexing the first modulation and coding scheme table in accordance with the value; and
receive the second codeword based at least in part on indexing the first modulation and coding scheme table in accordance with the value.

10. The UE of claim 1, wherein the first codeword is a common codeword that is to be decoded by the UE and one or more additional UEs and the second codeword is a private codeword that is to be decoded by the UE.

11. The UE of claim 1, wherein the second codeword is a common codeword that is to be decoded by the UE and one or more additional UEs and the first codeword is a private codeword that is to be decoded by the UE.

12. The UE of claim 1, wherein one or more modulation and coding schemes of the first modulation and coding scheme table have a smaller maximum modulation order, or a smaller spectral efficiency, or both, than one or more modulation and coding schemes of the second modulation and coding scheme table.

13. A network entity for wireless communication, comprising:
at least one processor; and
at least one memory coupled with the at least one processor, the at least one memory storing instructions executable by the at least one processor to cause the network entity to:
transmit a control message scheduling a physical downlink shared channel (PDSCH) transmission comprising a first codeword and a second codeword, the control message indicating a first modulation and coding scheme value and a first resource associated with the first codeword, and the control message indicating a second modulation and coding scheme value and a second resource associated with the second codeword;
generate the first codeword in accordance with one or more first parameters determined by indexing a first modulation and coding scheme table using the first modulation and coding scheme value;
generate the second codeword in accordance with one or more second parameters determined by indexing one of the first modulation and coding scheme table using the second modulation and coding scheme value or a second modulation and coding scheme table using the second modulation and coding scheme value; and
transmit, in accordance with the control message, the first codeword via the first resource and the second codeword via the second resource.

14. The network entity of claim 13,
wherein the instructions are further executable by the at least one processor to cause the network entity to:
transmit an indication of the first modulation and coding scheme table and the second modulation and coding scheme table; and
transmit the control message comprising a first grant scheduling the PDSCH transmission comprising the first codeword and the second codeword.

15. The network entity of claim 14, wherein the instructions are further executable by the at least one processor to cause the network entity to:
transmit an indication of a third modulation and coding scheme table;
transmit a second grant scheduling transmission of a third codeword and indicating a third modulation and coding scheme value associated with the third codeword; and
transmit, in accordance with the second grant, the third codeword based at least in part on indexing the third modulation and coding scheme table using the third modulation and coding scheme value.

16. The network entity of claim 13,
wherein the instructions are further executable by the at least one processor to cause the network entity to:
transmit the control message that is a downlink control information message that schedules the PDSCH transmission comprising the first codeword and the second codeword; and
index the first modulation and coding scheme table, the second modulation and coding scheme table, or both, based at least in part on a format of the downlink control information message.

17. The network entity of claim 13,
wherein the instructions are further executable by the at least one processor to cause the network entity to:
transmit control signaling indicating the second modulation and coding scheme table and a third modulation and coding scheme table;
transmit the control message comprising a grant that schedules the PDSCH transmission comprising the first codeword and the second codeword and that comprises cyclic redundancy check information that is scrambled with a modulation and coding scheme cell radio network temporary identifier;
transmit the first codeword based at least in part on indexing the first modulation and coding scheme table in response to the cyclic redundancy check information being scrambled with the modulation and coding scheme cell radio network temporary identifier; and
transmit the second codeword based at least in part on indexing the first modulation and coding scheme table in response to the cyclic redundancy check information being scrambled with the modulation and coding scheme cell radio network temporary identifier.

18. The network entity of claim 13,
wherein the instructions are further executable by the at least one processor to cause the network entity to:
transmit control signaling indicating the second modulation and coding scheme table and a third modulation and coding scheme table;
transmit the control message comprising a grant that schedules the PDSCH transmission comprising the first codeword and the second codeword and that comprises cyclic redundancy check information that is scrambled with a modulation and coding scheme cell radio network temporary identifier;
transmit the first codeword based at least in part on indexing the first modulation and coding scheme table in response to the cyclic redundancy check information being scrambled with the modulation and coding scheme cell radio network temporary identifier; and
transmit the second codeword based at least in part on indexing the second modulation and coding scheme table in response to the cyclic redundancy check information being scrambled with the modulation and coding scheme cell radio network temporary identifier.

19. The network entity of claim 13,
wherein the instructions are further executable by the at least one processor to cause the network entity to:
transmit the control message comprising a grant that schedules the PDSCH transmission comprising the first codeword and the second codeword and that comprises cyclic redundancy check information that is scrambled with a modulation and coding scheme cell radio network temporary identifier associated with multiple modulation and coding scheme tables;
transmit the first codeword based at least in part on indexing the first modulation and coding scheme table in response to the cyclic redundancy check information being scrambled with the modulation and coding scheme cell radio network temporary identifier; and
transmit the second codeword based at least in part on indexing the second modulation and coding scheme table in response to the cyclic redundancy check information being scrambled with the modulation and coding scheme cell radio network temporary identifier.

20. The network entity of claim 13, wherein the instructions are further executable by the at least one processor to cause the network entity to:
transmit the control message comprising a grant that schedules the PDSCH transmission comprising the first codeword and the second codeword and that comprises a field with a value that indicates that the first codeword and the second codeword are to be received using different modulation and coding scheme tables;
transmit the first codeword based at least in part on indexing the first modulation and coding scheme table in accordance with the value; and
transmit the second codeword based at least in part on indexing the second modulation and coding scheme table in accordance with the value.

21. The network entity of claim 13, wherein the instructions are further executable by the at least one processor to cause the network entity to:
transmit the control message comprising a grant that schedules the PDSCH transmission comprising the first codeword and the second codeword and that comprises a field with a value that indicates that the first codeword and the second codeword are to be received using a same modulation and coding scheme table;
transmit the first codeword based at least in part on indexing the first modulation and coding scheme table in accordance with the value; and
transmit the second codeword based at least in part on indexing the first modulation and coding scheme table in accordance with the value.

22. The network entity of claim 13, wherein the first codeword is a common codeword that is to be decoded by a UE and one or more additional UEs and the second codeword is a private codeword that is to be decoded by the UE.

23. The network entity of claim 13, wherein the second codeword is a common codeword that is to be decoded by a UE and one or more additional UEs and the first codeword is a private codeword that is to be decoded by the UE.

24. The network entity of claim 13, wherein one or more modulation and coding schemes of the first modulation and coding scheme table have a smaller maximum modulation order, or a smaller spectral efficiency, or both, than one or more modulation and coding schemes of the second modulation and coding scheme table.

25. A method for wireless communication at a user equipment (UE), comprising:
receiving a control message scheduling a physical downlink shared channel (PDSCH) transmission comprising a first codeword and a second codeword, the control message indicating a first modulation and coding scheme value and a first resource associated with the first codeword, and the control message indicating a second modulation and coding scheme value and a second resource associated with the second codeword;
monitoring, based at least in part on the control message, the first resource for the first codeword in accordance with one or more first parameters determined by indexing a first modulation and coding scheme table using the first modulation and coding scheme value;
monitoring, based at least in part on the control message, the second resource for the second codeword in accordance with one or more second parameters determined by indexing one of the first modulation and coding scheme table using the second modulation and coding scheme value or a second modulation and coding scheme table using the second modulation and coding scheme value; and
decoding the first codeword and the second codeword based at least in part on monitoring the first resource and the second resource.

26. The method of claim 25, further comprising:
receiving an indication of the first modulation and coding scheme table and the second modulation and coding scheme table; and
receiving the control message comprising a first grant scheduling the PDSCH transmission comprising the first codeword and the second codeword.

27. The method of claim 25, further comprising:
receiving control signaling indicating the second modulation and coding scheme table and a third modulation and coding scheme table;
receiving the control message comprising a grant that schedules the PDSCH transmission comprising the first codeword and the second codeword and that comprises cyclic redundancy check information that is scrambled with a modulation and coding scheme cell radio network temporary identifier;

receiving the first codeword based at least in part on indexing the first modulation and coding scheme table in response to the cyclic redundancy check information being scrambled with the modulation and coding scheme cell radio network temporary identifier; and receiving the second codeword based at least in part on indexing the first modulation and coding scheme table in response to the cyclic redundancy check information being scrambled with the modulation and coding scheme cell radio network temporary identifier.

28. A method for wireless communication at a network entity, comprising:

transmitting a control message scheduling a physical downlink shared channel (PDSCH) transmission comprising a first codeword and a second codeword, the control message indicating a first modulation and coding scheme value and a first resource associated with the first codeword, and the control message indicating a second modulation and coding scheme value and a second resource associated with the second codeword;

generating the first codeword in accordance with one or more first parameters determined by indexing a first modulation and coding scheme table using the first modulation and coding scheme value;

generating the second codeword in accordance with one or more second parameters determined by indexing one of the first modulation and coding scheme table using the second modulation and coding scheme value or a second modulation and coding scheme table using the second modulation and coding scheme value; and transmitting in accordance with the control message, the first codeword via the first resource and the second codeword via the second resource.

29. The method of claim 28, further comprising:

transmitting an indication of the first modulation and coding scheme table and the second modulation and coding scheme table; and transmitting the control message comprising a first grant scheduling the PDSCH transmission comprising the first codeword and the second codeword.

30. The method of claim 28, further comprising:

transmitting control signaling indicating the second modulation and coding scheme table and a third modulation and coding scheme table;

transmitting the control message comprising a grant that schedules the PDSCH transmission comprising the first codeword and the second codeword and that comprises cyclic redundancy check information that is scrambled with a modulation and coding scheme cell radio network temporary identifier;

transmitting the first codeword based at least in part on indexing the first modulation and coding scheme table in response to the cyclic redundancy check information being scrambled with the modulation and coding scheme cell radio network temporary identifier; and transmitting the second codeword based at least in part on indexing the first modulation and coding scheme table in response to the cyclic redundancy check information being scrambled with the modulation and coding scheme cell radio network temporary identifier.

* * * * *